(12) United States Patent
Shrivastava et al.

(10) Patent No.: US 7,395,458 B2
(45) Date of Patent: Jul. 1, 2008

(54) DIAGNOSTIC INSTRUMENTATION

(75) Inventors: Sandeep Shrivastava, Burlington, MA (US); Rajendra Inamdar, N. Cheimsford, MA (US); Ryan LeCompte, Natick, MA (US); R. Sean Lindsay, Watertown, MA (US); Stephen Hess, North Reading, MA (US); Richard Mousseau, Stratham, NH (US)

(73) Assignee: BEA Systems, Inc., San Jose, CA (US)

( * ) Notice: Subject to any disclaimer, the term of this patent is extended or adjusted under 35 U.S.C. 154(b) by 520 days.

(21) Appl. No.: 11/133,633

(22) Filed: May 20, 2005

(65) Prior Publication Data

US 2005/0273667 A1 Dec. 8, 2005

Related U.S. Application Data

(60) Provisional application No. 60/573,280, filed on May 21, 2004.

(51) Int. Cl.
*G06F 11/00* (2006.01)

(52) U.S. Cl. ..................................... 714/47
(58) Field of Classification Search .................. 714/47
See application file for complete search history.

(56) References Cited

U.S. PATENT DOCUMENTS

| | | | |
|---|---|---|---|
| 3,647,971 A | 3/1972 | Cushman et al. | |
| 4,060,716 A | 11/1977 | Pekrul et al. | |
| 4,481,577 A | 11/1984 | Forson | |
| 4,943,919 A | 7/1990 | Aslin et al. | |
| 5,485,573 A | 1/1996 | Tandon | |
| 5,594,740 A | 1/1997 | LaDue | |
| 5,673,386 A | 9/1997 | Batra | |
| 6,061,507 A | 5/2000 | Fitzgerald et al. | |
| 6,298,454 B1 | 10/2001 | Schleiss et al. | |
| 6,338,148 B1 | 1/2002 | Gillenwater et al. | |
| 6,492,904 B2 | 12/2002 | Richards | |
| 6,531,971 B2 | 3/2003 | Kempf | |
| 6,763,497 B1 | 7/2004 | Softky | |
| 7,039,644 B2 * | 5/2006 | Hind et al. | 707/101 |
| 7,137,104 B2 * | 11/2006 | Tip et al. | 717/126 |
| 7,178,131 B2 * | 2/2007 | Mitchell et al. | 717/124 |
| 7,203,930 B1 | 4/2007 | Kirkpatrick et al. | |
| 7,283,789 B2 | 10/2007 | Choi | |
| 2002/0053045 A1 | 5/2002 | Gillenwater et al. | |
| 2003/0052776 A1 | 3/2003 | Richards | |
| 2003/0149960 A1 * | 8/2003 | Inamdar | 717/118 |
| 2003/0163729 A1 | 8/2003 | Buchegger | |
| 2003/0216889 A1 | 11/2003 | Marko | |
| 2003/0217067 A1 | 11/2003 | Gilstrap et al. | |
| 2003/0229691 A1 | 12/2003 | Ishimoto | |
| 2004/0123187 A1 * | 6/2004 | Colyer | 714/38 |
| 2004/0225689 A1 | 11/2004 | Dettinger et al. | |

(Continued)

FOREIGN PATENT DOCUMENTS

DE 4302908 3/1994

(Continued)

*Primary Examiner*—Marc Duncan
(74) *Attorney, Agent, or Firm*—Fliesler Meyer LLP

(57) ABSTRACT

Diagnostic Instrumentation system can use diagnostic monitors. The diagnostic monitors can be indicated using instrumentation at class loading time. The diagnostic monitors can have associated diagnostic functions which can be enabled or disenabled while the server software is running.

22 Claims, 9 Drawing Sheets

U.S. PATENT DOCUMENTS

| | | |
|---|---|---|
| 2004/0237028 A1 | 11/2004 | Softky |
| 2005/0015685 A1 | 1/2005 | Yamamoto |
| 2005/0046583 A1 | 3/2005 | Richards |
| 2005/0261875 A1 | 11/2005 | Shrivastava et al. |
| 2005/0261878 A1 | 11/2005 | Shrivastava et al. |
| 2005/0261879 A1 | 11/2005 | Shrivastava et al. |
| 2005/0273490 A1 | 12/2005 | Shrivastava et al. |
| 2005/0273667 A1 | 12/2005 | Shrivastava et al. |
| 2006/0020858 A1 | 1/2006 | Schaefer |
| 2006/0238348 A1 | 10/2006 | Richards |
| 2007/0198908 A1 | 8/2007 | Kirkpatrick et al. |
| 2007/0244571 A1 | 10/2007 | Wilson et al. |
| 2008/0025399 A1 | 1/2008 | Le Leannec et al. |

FOREIGN PATENT DOCUMENTS

| | | |
|---|---|---|
| EP | 0028167 | 5/1981 |
| JP | 59121556 | 7/1984 |
| JP | 2006281684 | 10/1994 |
| JP | 2003256036 | 9/2003 |

* cited by examiner

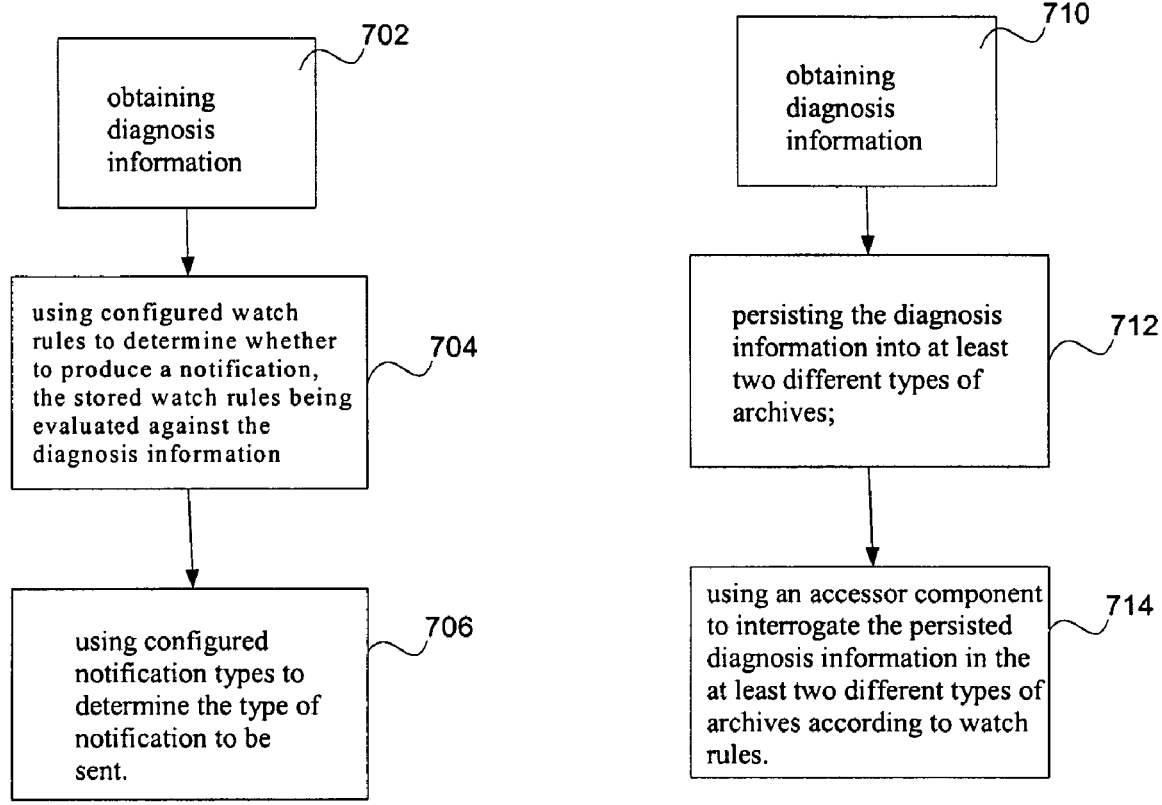

DIAGNOSTIC INSTRUMENTATION

CLAIMS OF PRIORTY

This application claims priority to U.S. Provisional Application No. 60/573,280 entitled "Diagnostics" filed May 21, 2004 by Shrivastava et al.

BACKGROUND OF INVENTION

Server software, such as application servers, can provide application infrastructure for modern business systems. Application servers can support applications that share data and resources with other systems, and can generate dynamic information for Web pages and other user interfaces. The application servers can provide a layer of functions and services between Web servers and underlying applications and databases. As companies deploy large applications to support secure transactions and use Web and XML protocols, the growing complexity of the applications can require a managed environment for the applications. Globally deployed applications with complex business logic potentially servicing tens of thousands of concurrent users in real-time, require a scalability and reliability that makes quality application servers a necessity.

Application Servers can provide functions and services, such as load balancing, fault tolerance, web services, network transparency, legacy integration, transaction management, security, messaging, multi-threading, persistence, database connectivity, resource pooling, and development, testing, and packaging facilities. Built-in functionality from the application server can speed application development and can relieve developers of the effort and expense of creating important services on their own. Applications can then provide more functionality, be developed faster, be less costly to maintain, and provide a greater return on investment.

BRIEF DESCRIPTION OF THE DRAWINGS

FIGS. 7A and 7B illustrate methods of embodiments of the present invention.

DETAILED DESCRIPTION

A number of embodiments of the present invention concern inventions that can be used as part of a diagnostic framework. A diagnostic framework can be used to monitor server software and applications deployed to it. The diagnostic framework can a part of or separate from the server software.

Figure 1:
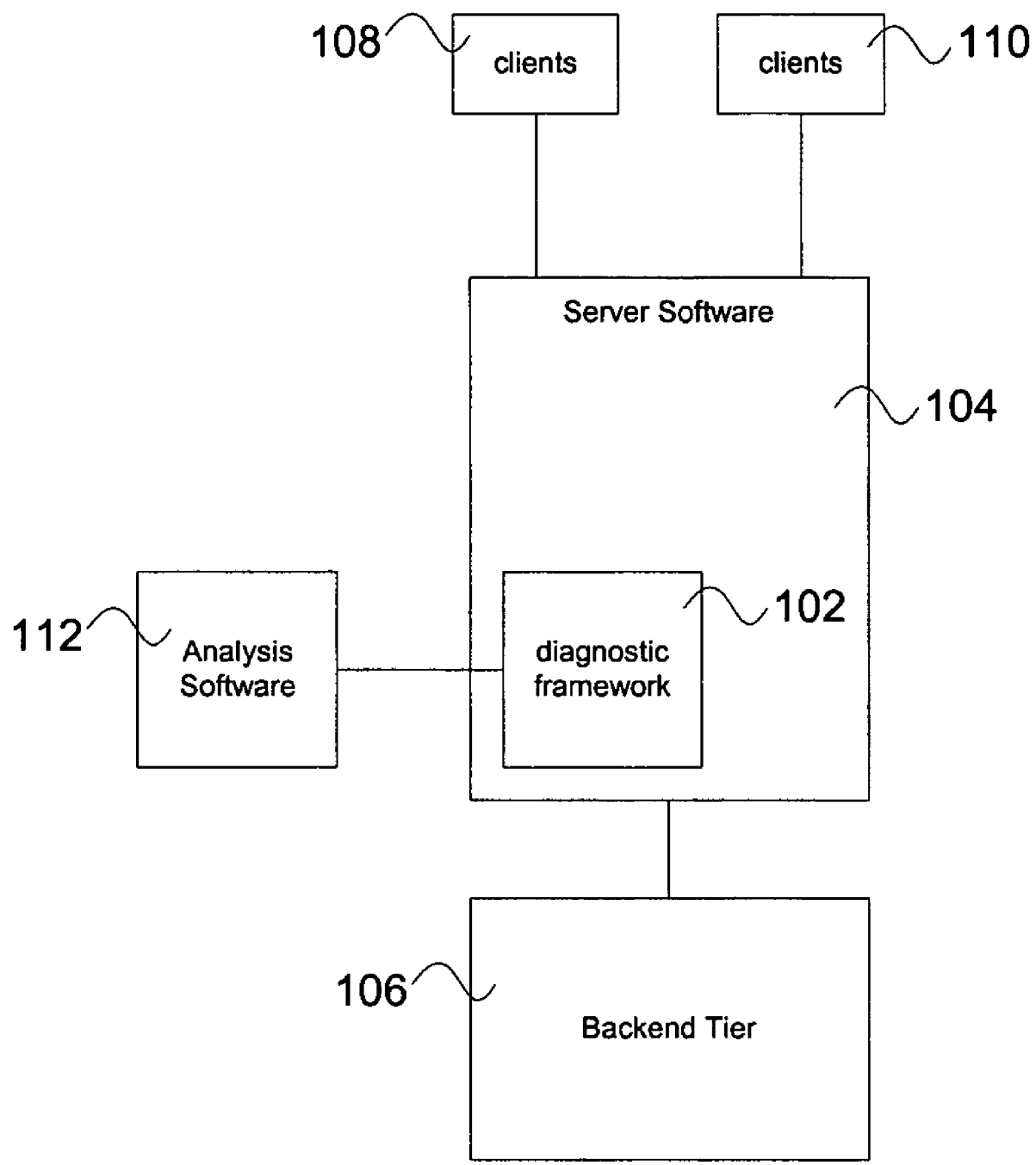
FIG. 1 illustrates a server software system including a diagnostic framework of one embodiment of the present invention.

FIG. 1 illustrates a diagnostic framework 102 for server software 104. The server software can be, for example, a J2EE-based server software, such as the WebLogic server available from BEA Systems, Inc., of San Jose, Calif. Typically, the server software 104 interacts with a backend tier 106 to provide services for clients, such as clients 108 and 110. The diagnostic framework 102 can interact with a third party analysis software 112. The diagnostic framework can provide access to the diagnostics for the server software and for applications that run on the server software.

Figure 2:
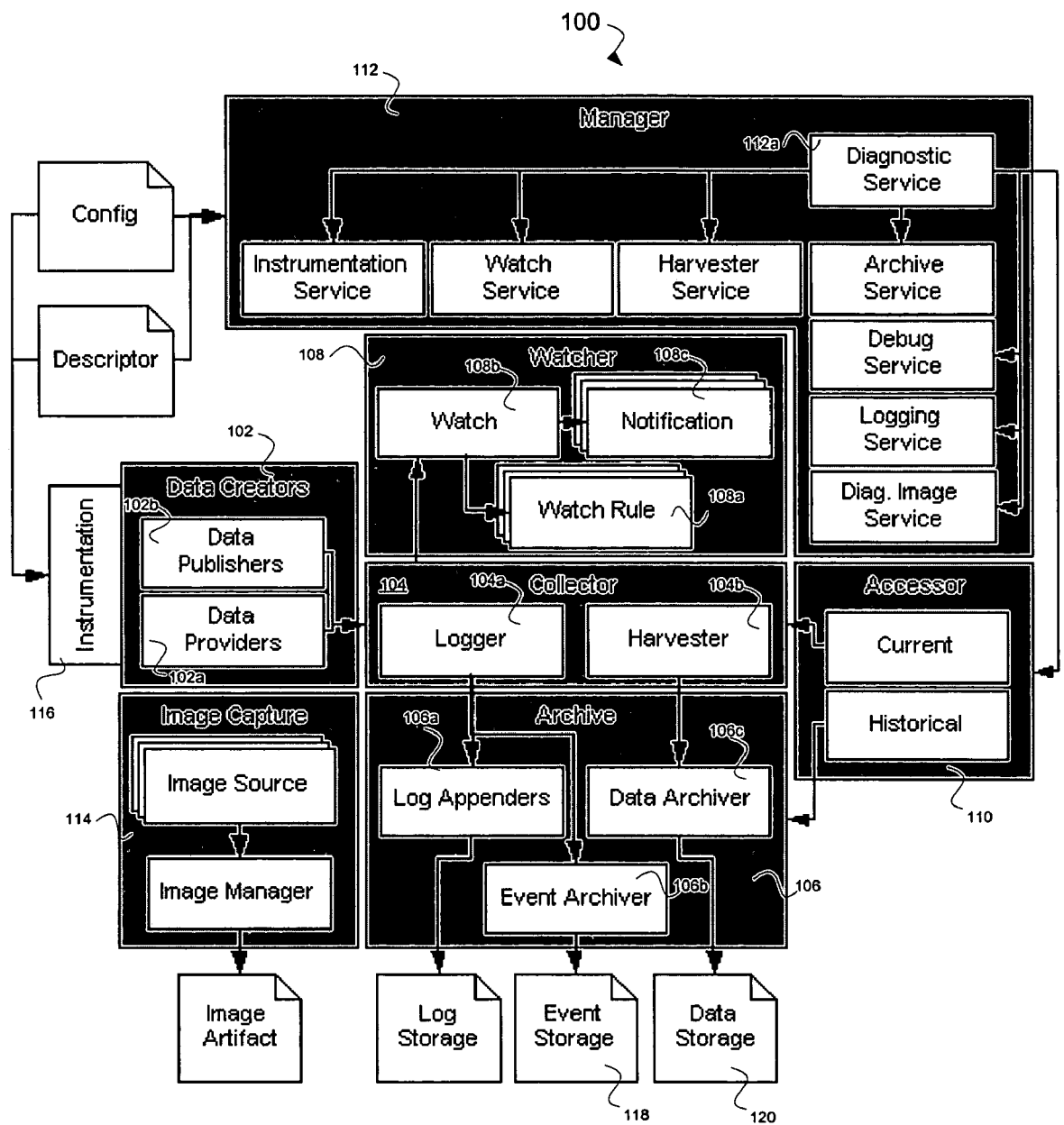
FIG. 2 is a diagram of a diagnostic framework of one embodiment of the present invention.

FIG. 2 shows a non-limiting example of a diagnostic framework 200. As shown in the example of FIG. 2, a Diagnostic Framework 200 can consist of a number of components that work together to collect, archive, and access diagnostic information about the server and the applications it hosts.

Data Creators 202 can generate diagnostic data that is consumed by a Collector 204 The Collector 204 can coordinate with an Archive 206 to persist this data and with the Watch & Notification system 208 to provide automated monitoring. The Accessor 210 can interact with the Collector 204 to expose current diagnostic data and with the Archive 206 to present historical data. The Manager 212 can provide a configuration and control interface for managing the diagnostic framework 200. The Image Capture facility 214 can provide a model for capturing a diagnostic snapshot of key server state.

In one embodiment, the framework components operate at the server level and are only aware of server scope. In one embodiment, the components except for the Manager can exist entirely within the server process and participate in the standard server lifecycle. In one embodiment, artifacts of the framework can be configured and stored on a per server basis.

Diagnostic data can be collected from a number of sources. These sources can be logically classified as either providers 202a, data creators that are sampled at regular intervals to harvest current values, or publishers 202b, data creators that synchronously generate events.

In one embodiment, within the server codebase, invocations of the logging infrastructure through the catalog infrastructure, the debugging model, or directly through the logger serve as inline data publishers and the generated data is collected as events.

The instrumentation system 216 can create monitors and advice, some of which are publishers and some of which are providers, and insinuate them at well defined points in the flow of execution. Publishers 202b can generate events that are consumed by a traditional logging framework 204a. Providers 202a can expose their data to the Harvester 204b using a data source interface. In one embodiment, components registered with the MBean Server may also make themselves known as data providers by registering with the Harvester 204b.

Providers 202a registered with the Harvester 204b can be eligible for collection based on the current harvesting configuration, which is dynamically controllable through the management interface. Collected data can then be exposed to both the Watch & Notification system 108 for automated monitoring and to the Archive 206 for persistence.

Past state is often important to diagnostic faults in a system. State can be captured and archived for future access, creating a historical archive. In the diagnostic framework 200, the Archive 206 can meet this need using persistence components. Both events and harvested metrics can be persisted and made available for historical review.

Traditional logging information, which is human readable and intended for inclusion in the server log can be persisted through the standard logging appenders 206a. New event data that is intended for system consumption and may be compacted and need not be human readable can be persisted into an event store 218 using an event archiver 206b. Metric data can be persisted into a data store 220 using a data archiver 206c.

The archive 106 can provide access interfaces so that the Accessor 110 may expose any of the persisted historical data.

The Watch & Notification system 208 can be used to create automated monitors to look for specific diagnostic states and send notification based on configured rules.

A watch rule 208a can monitor either event data from a Data Publisher 202b or metric data from a Data Provider 202a that is harvested by the Harvester. The Watcher 208 can be capable of managing watches 202b that are composed of a number of watch rules. For each watch 202b, a number of notifications 202c may be configured. By default every watch 202b can log an event in the server log. In addition, an number of notifications, such as Simple Mail Transfer Protocol (SMTP), Simple Network Management Protocol (SNMP), Java Management extensions (JMX), and Java Messaging Service (JMS) notifications, can be supported.

The Accessor 210 can provide access to the data collected by the framework 200 including event and metric data. The Accessor 210 can interact with the Harvester 204b to get the current state of harvestable values in the server. The Accessor 210 can interact with the Archive 206 to get historical state including logged event data and persisted metrics.

When accessing data in a running server, a JMX based access service can be used. The Accessor 210 can provide for data lookup by type, by component, and by attribute. It permits time based filtering and in the case of events filtering by severity, source and content.

Tools may wish to access data that was persisted by a server which is not currently active. In these cases, an offline Accessor can be provided. The offline Accessor can support access to historical data.

The Manager 212 can provide a management interface for the diagnostic framework 200. The Manager 212 can provide access to a server specific top level Diagnostic Service 212a which then provides references to the appropriate component specific services. Each service can then reference the appropriate configuration component and the appropriate runtime component running in the content of the server of interest.

The Manager 212 can provide the management interface of the entire framework. It can provide access to a server specific top level Diagnostic Service 212a which then provides references to the appropriate component specific services. Each service can then reference the appropriate configuration component and the appropriate runtime component running in the content of the server of interest.

The management interface can be JMX-based and use service oriented interfaces. The service components can be defined as Runtime MBeans. The service components can exist in the administration server and interact with runtime components that exist in the server process associated with the framework instance. In addition to management services, the Diagnostic Service can provide diagnostic data about the framework itself and a reference to the Accessor for the given server.

The Diagnostic Image support 214 can gather the most common sources of key server state used in diagnosing problems and packages that state into a single artifact that can be made available to support in the near term and may be fed into automated analysis tools in the future. The diagnostic image can be in essence, a diagnostic snapshot or dump from the server. The image capture support 214 can include both an on demand capture process and an automated capture based on some basic failure detection.

In one embodiment, a diagnostic framework can capture and archive meaningful state that may be used to monitor and diagnose problems that arise in a running server. In one embodiment, the framework is focused on capturing and providing diagnostic data but does not require any of consumption tools that may access, analyze, or present the data.

The diagnostic framework can pull all diagnostics features and functionality under one umbrella, and can be flexible enough to support modules such as system analysis and feedback control required for adaptive systems management The framework can expose activation and control of all key features dynamically in a running environment, providing the most significant diagnostic value in the state which much be investigated.

The diagnostic framework can introduce a minimal inactive overhead and a reasonable overhead when significant diagnostic collection is in effect. The diagnostic framework can allow for expansion for both the data and functionality available in the core offering, and allow application developers and tools vendors flexibility to easily integrate and extend the framework with advanced tools.

Diagnostic Context

One embodiment of the present invention comprises receiving a request into server software; associating a diagnostic context with the request, and at a later diagnosis point of the server software, using the diagnostic context to determine whether to do a diagnosis function.

Figure 3A:
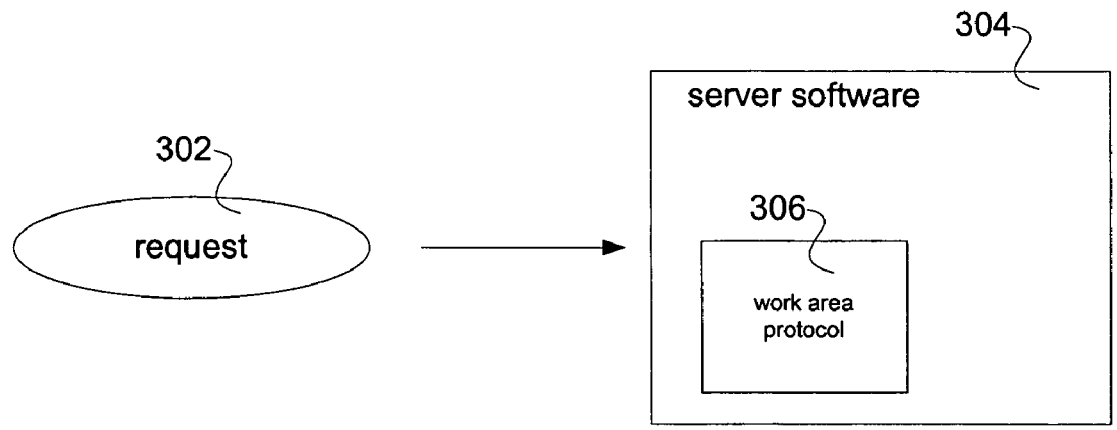
FIG. 3A is a diagram illustrating a work area protocol unit in a server software.

FIG. 3A illustrates an example when a request 302 is received by server software 304. The request typically causes a number of different operations by the server software 304. The diagnostic context can allow diagnostic information to be collected for a specific request or type of request. In one embodiment, the diagnostic context can be implemented using a work area protocol. An example of a work area protocol is given in the Java Service Request (JSR) 149. The work area protocol describes the association of a context with requests. This context can be provided by the work area protocol across different servers and for the life of the request. In the example of FIG. 3A, a work area protocol unit 306 is used by the server software 304 associate contexts with requests.

Figure 3B:
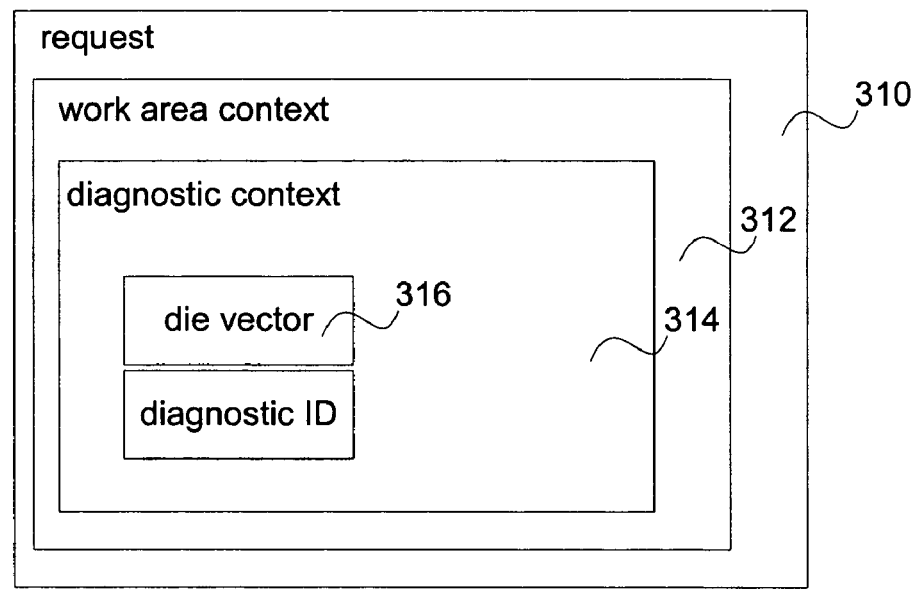
FIG. 3B is a conceptual diagram illustrating the diagnostic context associated with a request.

FIG. 3B illustrates a conceptual diagram of a request 310 having a defined work area context 312. All or a portion of the work area context 312 can be a diagnostic context 314. The diagnostic context 314 can be used by the server software to determine whether to do a diagnostic function. In one embodiment, a dye vector 316 is used to determine whether to do the diagnostic function.

By using a diagnostic context associated with a request to determine whether to do diagnostic functions such as collecting diagnostic data, the amount of diagnostic data can be reduced preventing the administrator from being flooded with data. In one embodiment, only diagnostic data associated with the request is collected.

Figure 3C:
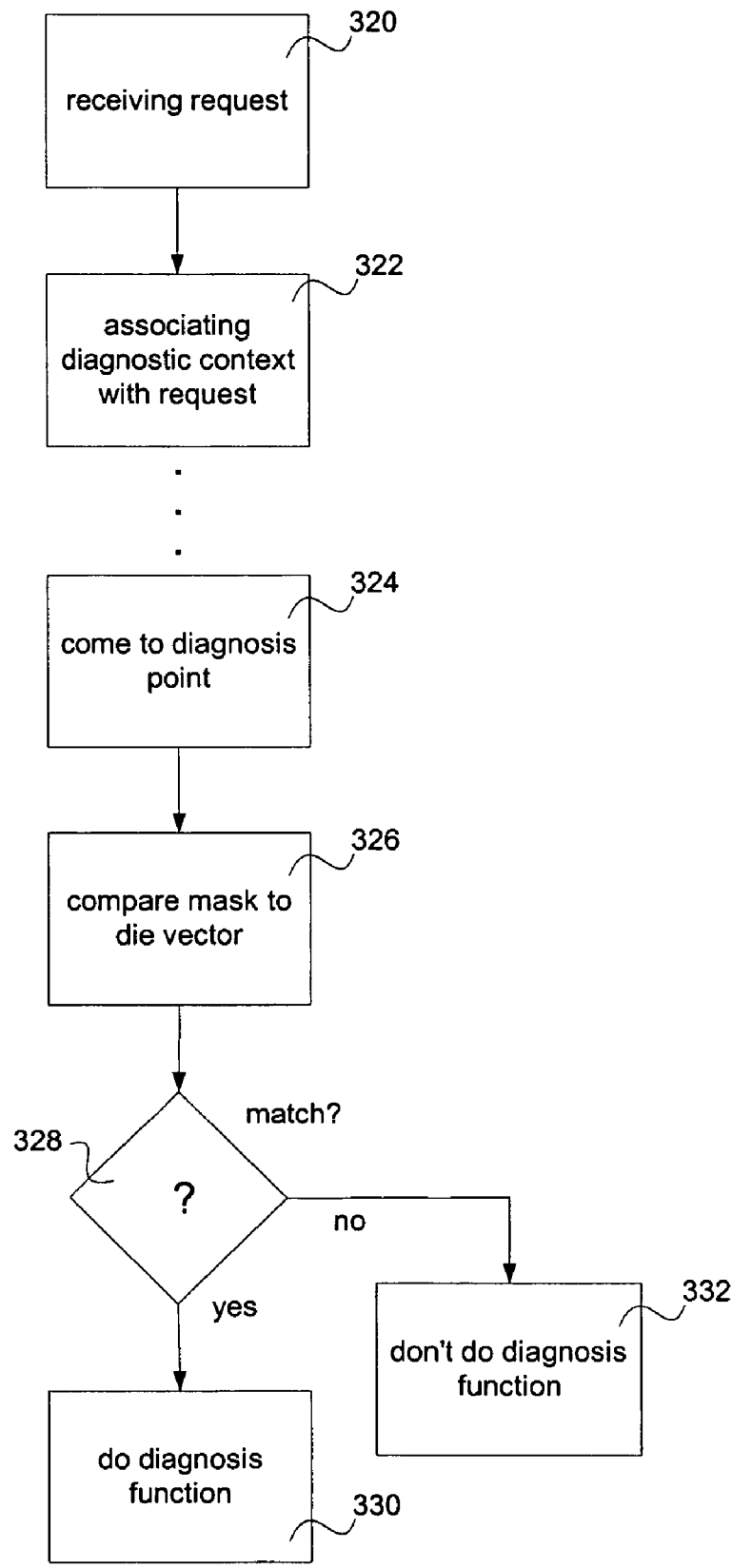
FIG. 3C is a flow chart illustrating one embodiment of a method of the present invention.

FIG. 3C illustrates a flow chart of one embodiment of a method of the present invention. In step 320, a request is received by the server software. In step 322, a diagnostic context is associated with the request. This can be done by using the work area protocol. Later, in step 324, the system can come to a diagnosis point. In step 326, the diagnostic context can be used to determine whether to do a diagnostic function. In one embodiment, a mask can be compared to a dye vector of the diagnostic context. In step 328, based upon the comparison, the diagnostic function is either done in step 330 or not done in step 332. In one embodiment, the dye vector is ANDed with the mask and then compared to the mask to determine whether to do the diagnostic function. The diagnostic function can be any diagnostic operation including using a counter to determine how many times the request goes thorough the diagnosis point, storing arguments, and the like. The diagnostic function can be a part of a diagnostic monitor as described below.

Proper functioning of an application server can be monitored by collecting and analyzing diagnostic data while the server is running. However, in a production environment, large number of requests is typically serviced by the server, which can result in information overload. Generation, collection and analysis of diagnostic data can impose heavy burden on the server as well as analysis tools/personnel, which in turn can result in general slowdown.

A Request Dyeing feature can make it possible to focus on only requests of interest, without adverse impact on the performance of rest of the server. It also makes it possible to keep the volume of diagnostic data to manageable levels, thus facilitating analysis of diagnostic data.

One embodiment of the present invention is software comprising code to associate a diagnostic context with a request into server software; and code to use the diagnostic context to determine whether to do a diagnosis function at a later diagnosis point of the server software.

The code to associate the diagnostic context with a request into the server software can be code associated with a work area protocol. The code to use the diagnostic context can be the code that obtains the diagnostic context compares the dye vector with a mask and then determines whether to do the diagnosis function.

Figure 3D:
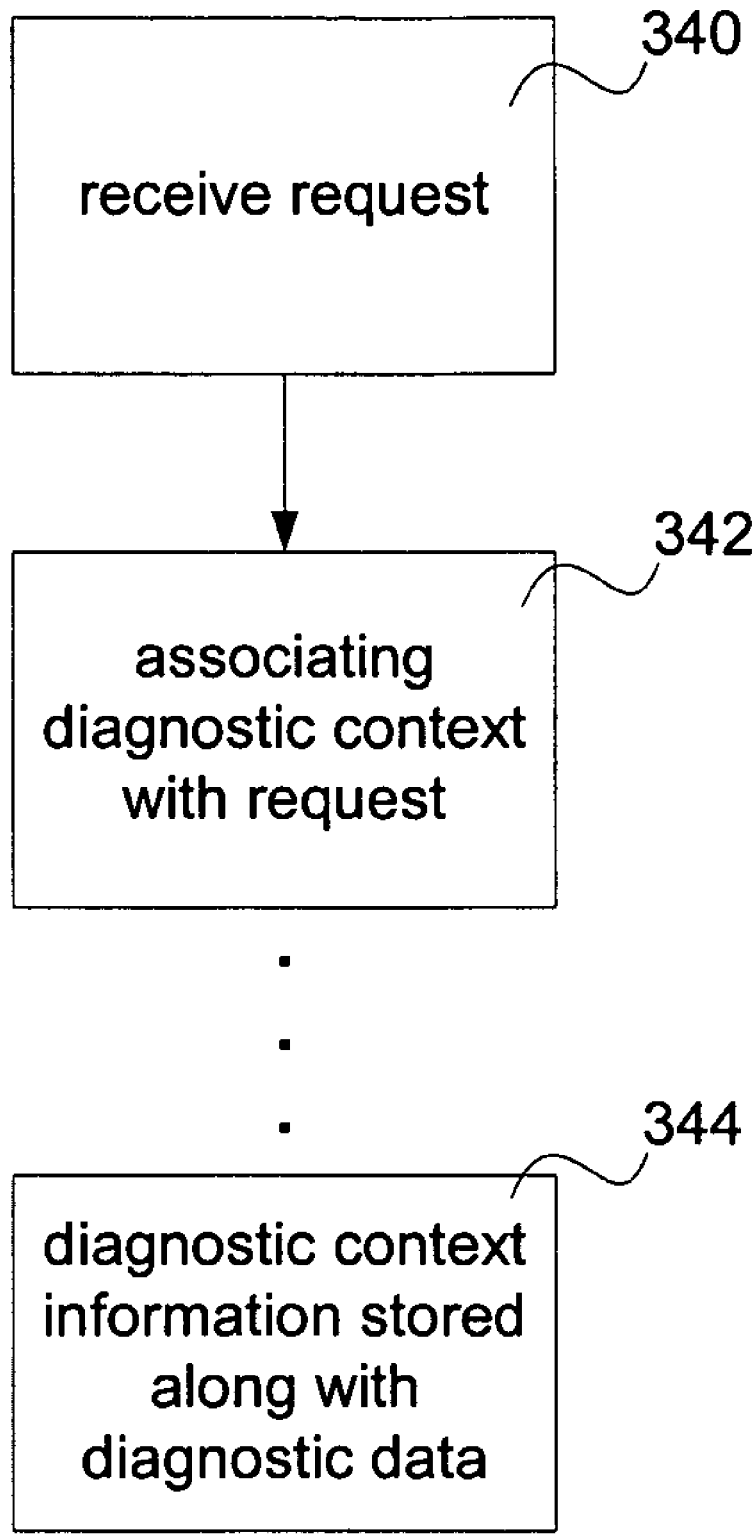
FIG. 3D is a diagram of another embodiment of the present invention.

FIG. 3D illustrates another use of a diagnostic context. In step 340, a request is received. In step 342, a diagnostic context is associated with the request. In step 344, the diagnostic context for the request is stored along with the diagnosing data for the request. For an example, diagnostic context ID identifying the request can be stored along with the diagnostic data so that later functions can easily obtain the diagnostic data for the request from an archive for example.

Storing the diagnostic context ID along with the diagnostic context information makes it easy to track the diagnosis information associated with a request. Tools can be used to get the stored diagnosis information of the request.

One embodiment of the present invention comprises receiving a request into server software; associating a diagnostic context with the request; and storing the diagnostic context information for the request along with the diagnosis data for the request.

A busy production server can generate large amount of diagnostic data. As requests flow through the system, they can generate related diagnostic information. Often, it is useful to analyze this related information. A Request Correlation feature provides a means to correlate diagnostic information which is generated as a request progresses through the system.

Diagnostic Instrumentation

One embodiment of the present invention comprises instramenting classes of server software with a diagnostic monitor, the diagnostic monitor including at least one diagnostic function; and enabling the diagnostic function at the diagnostic monitor while the server software is running without restarting the server software.

Figure 4A:
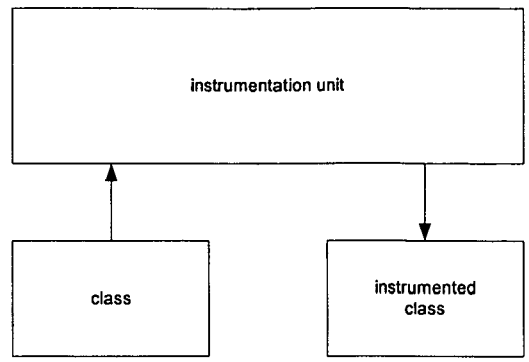
FIG. 4A illustrates the use of instrumentation in one embodiment of the present invention.

FIG. 4A illustrates an embodiment illustrating the instrumentation of classes in one embodiment. Instrumentation can be done for diagnostic monitors to include a diagnostic action (diagnostic function). Typically, the instrumentation can be done when a class is loaded. If the Java Virtual Machine (JVM) is modified, the instrumentation can be done during runtime using hot swap functionality enabled by some virtual machines such as JRockit. One embodiment of the present invention, describes a way of allowing for the modification, addition and removal of diagnostic functions from the system without requiring a JVM that provides hot swap functionality.

Figure 4B:
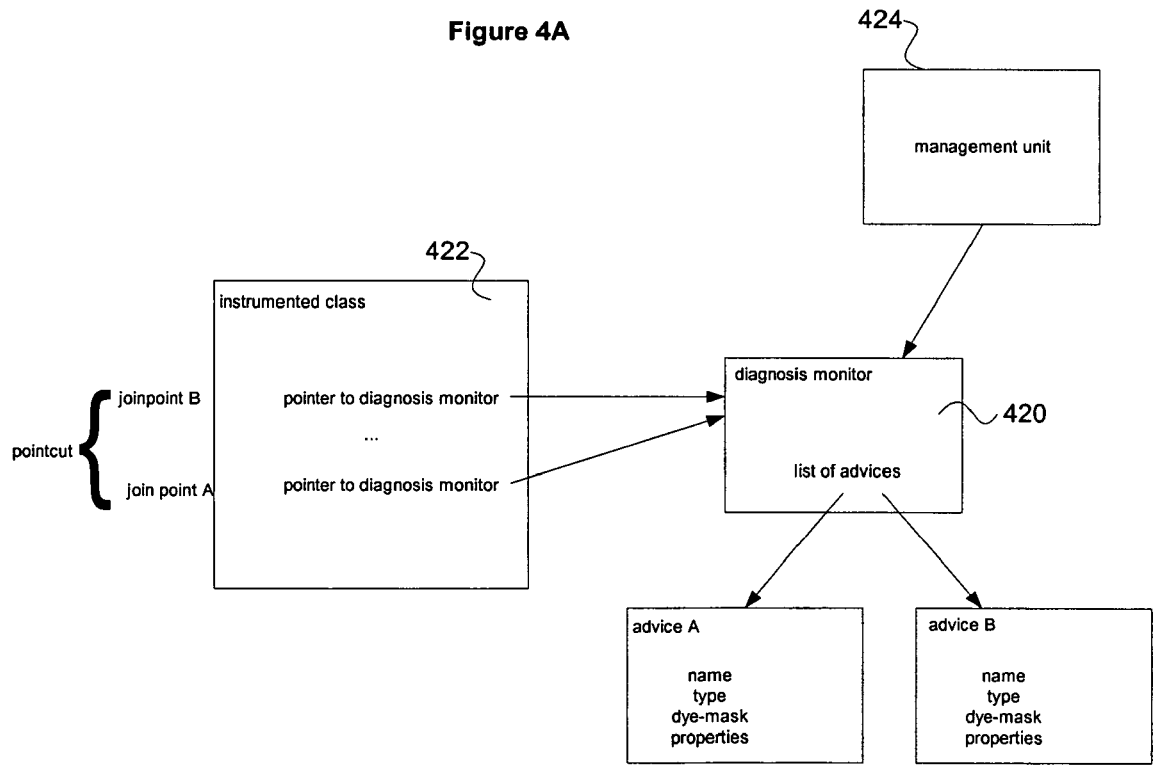
FIG. 4B illustrates the use of the diagnostic monitor of one embodiment of the present invention.

As shown in FIG. 4B, pointcut can include a set of joint points. When a program reaches one of the joint points described by the pointcut, code (such as an advice) associated with the pointcut is executed. Pointcuts indicate where additional code on top of the clearly defined behavior can be inserted.

In one embodiment, a diagnostic monitor 420 is associated with a pointcut, thus in the instrumented class each of the joint points can have an indicator to the diagnostic monitor 420. In one embodiment, the advises for the diagnostic functions can include a name, type, dye mask and properties. Runtime Management software 424 can be used to enable a diagnostic monitor or to modify a list of associated advices for the diagnostic monitor. Diagnostic functions can be added or removed during runtime by a runtime management unit 424. This can be done by adding or removing an advice from the list of advices for the diagnostic monitor. Diagnostic monitors that can have the diagnostic functions or advices changed while the server is running can be called delegating monitors.

A dye mask can be used so that the diagnostic function is run only for some subset of the requests as indicated by the dye vector in the diagnostic context for the request. In one embodiment, removing all of the listed advises from the diagnostic monitor 420 disables the diagnostic functions associated with the diagnostic monitor.

The diagnostic functions can include counters, and the saving of arguments, including the saving of input arguments and the saving of output arguments. In one embodiment, the diagnostic functions are limited by the server software to a predetermined set of functions. The server software can limit the diagnostic functions to a predetermined set of actions to prevent the functionality of the server software from being overly modified.

The instrumentation can include weaving in an indication of the diagnostic monitor at each joint point. A library of diagnostic monitors can be provided along with a variety of advices. Note that the diagnostic functions can be selected for diagnostic monitor while the server software is running without restarting the server software, because although the instrumentation is done at class loading time, the diagnostic monitor 420 can be modified by the management unit 424 without requiring a restart of the server software.

One embodiment of the present invention is software comprising an instrumentation unit to instrument server software at a pointcut with a diagnostic monitor. The diagnostic monitor having at least one diagnostic function. The diagnostic function can be enabled for a pointcut at the diagnostic monitor while the server software is running without restarting the server software.

One embodiment of the present invention is a method comprising instrumenting classes of server software with a diagnostic monitor; and selecting and enabling a diagnostic function for the diagnostic monitor while the server software is running without restarting the server software. Such diagnostic monitors can be called delegating monitors.

Visibility into functioning of a running application is important for diagnosing problems and identifying bottlenecks before they become critical. The application programmer can provide visibility by adding suitable diagnostic code into the application. However, it is tedious and not flexible, since it cannot be changed after the application is developed. Also, it can introduce some performance penalty even though not in use.

A Dynamic Declarative Diagnostic instrumentation system provides a dynamic and declarative way of adding diagnostic code into already built applications. Such code can be added with no programming effort by the application developer or the administrator. The diagnostic code can be dynamically added or removed from the application.

Diagnostic Image

One embodiment of the present invention comprises upon an event, compiling diagnostic information about the state of server software into a data stream; and compressing the data stream.

Figure 5:
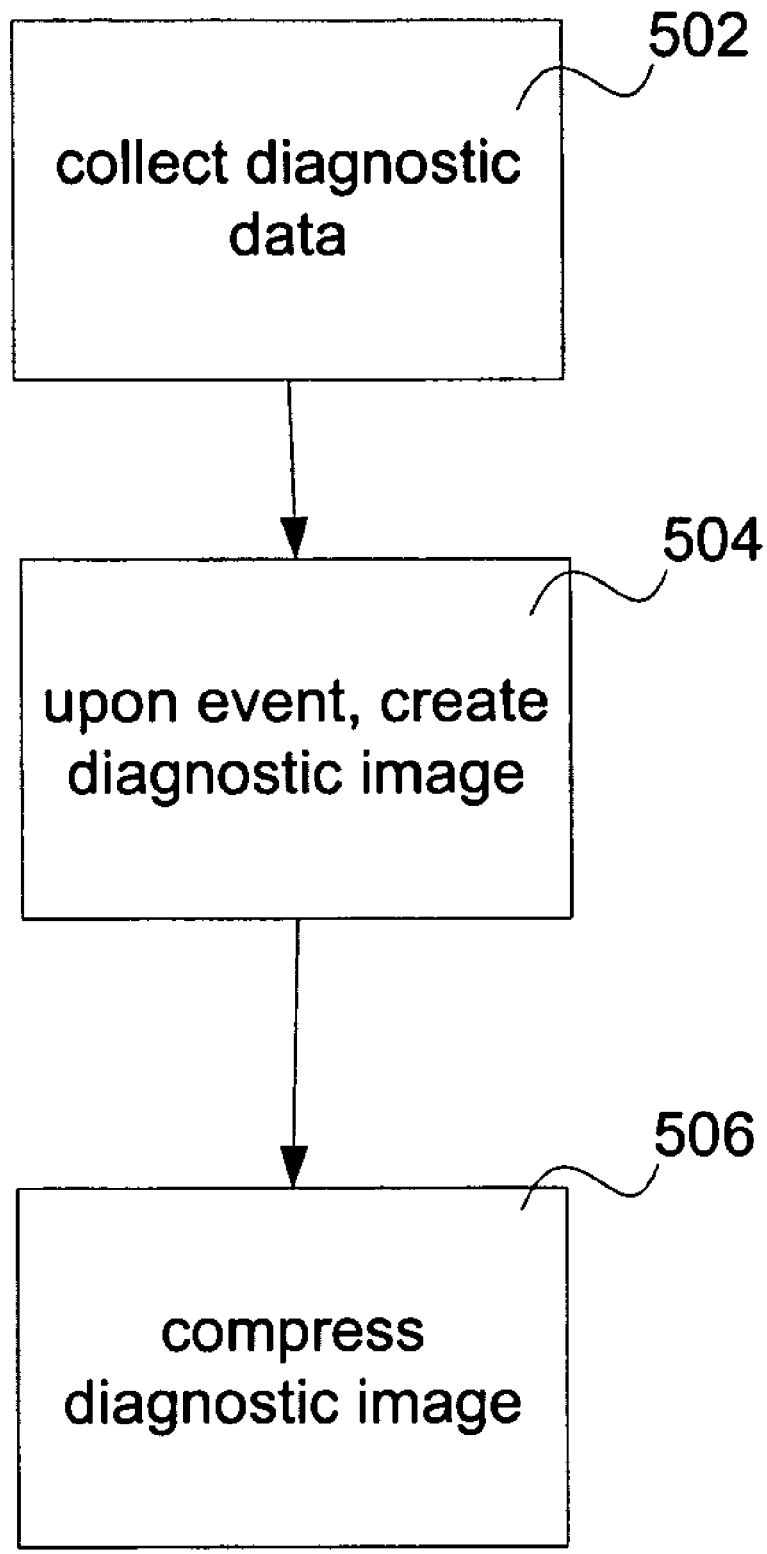
FIG. 5 illustrates a method of one embodiment of the present invention.

FIG. 5 illustrates an embodiment of the present invention. In step 502, the diagnostic data is collected. Typically, the diagnostic data is kept in volatile memory. The diagnostic data can be collected at different collection points through the server software and applications. In Step 504, upon an event, diagnostic image is created. The event can be recognition by the server software of a prefailure state or can be an event such as the user selecting the collection of the diagnostic image. The collected diagnostic information can be a diagnostic image including information concerning multiple software components of the server software. The diagnostic image file can be very large, for example, over 1 megabyte. In step 506, the diagnostic image is compressed. In one embodiment, the diagnostic information is compressed into a zip file. The compressed zip file can be sent across the internet from a server software site to a central location, such as the office of the server software vendor. The compressed diagnostic image can be sent in an email.

In one embodiment, a diagnostic image is not created for each failure. The creation of multiple diagnostic images can be expensive because of large size of the diagnostic images. A timer can be used to inhibit the collection of multiple diagnostic images.

One embodiment of the present invention includes software including code to, upon an event, compile diagnostic information about the state of server software into a data stream; and code to compress the data stream.

Hierachical Debug

One embodiment of the present invention comprises server software including: debug points capable of activation to get debug information; and metadata identifying logical groupings of debug points to allow activation of a group of debug points, wherein the metadata allows for the activation of logically grouped debug points across package boundaries.

The debug point can be a point at which a diagnosis function is done. The debug point can include a comparison to a request dye so that debug information is only collected for certain requests.

One embodiment of the present invention includes metadata based selection of debug points. In one embodiment, the activation of the debug points is done based upon stored debug activation selections. One way to do this is to use an MBean such as a service debug MBean to indicate which debug points are activated. MBean can be very complicated for large application servers and it can be hard for a user to select the debug points using the MBean.

Similar functions can be distributed within different packages. For example, security function can be distributed among various packages and if a person wants to debug security, they need to know exactly which packages to turn on for security. For example, in the Log4j instrumentation system debug locations are turned on based upon the granularity of the package names and the users need to know which of the packages are associated with a given function.

Figure 6A:
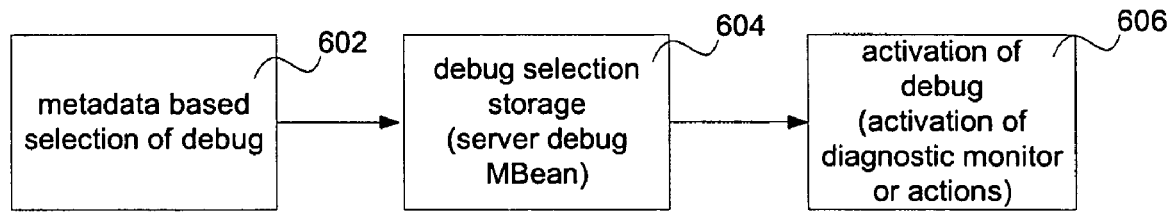
FIG. 6A illustrates the operation of a metadata-based selection of debug information of one embodiment.

FIG. 6A illustrates a case in which a metadata-based selection of a debug is done. A unit 602 is used for metadata-based selection of debug. This can be used to allow a user to update a debug storage 604 such as a server debug MBean. The debug selection storage is then used for the activation of debug 606 within the server software. In one embodiment, a diagnostic monitor for example can be activated based upon the information stored in the server debug MBean.

Figure 6B:
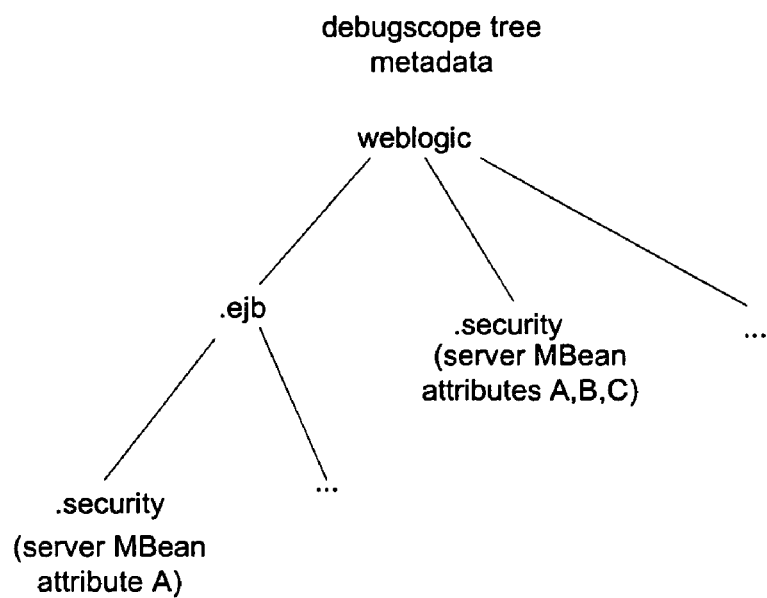
FIG. 6B illustrates a debugscope tree for metadata of one embodiment of the present invention.

FIG. 6B illustrates one example of metadata that allows for the activation of the debug points cross package boundaries. FIG. 6B shows debugscope tree metadata. In this embodiment, a debugscope tree is used to determine which attributes to store within the debug selection storage, such as which attributes to set in a debug MBean. In this example, the server MBean attributes are associated with nodes, such as leaves, of the debugscope tree. In this case, the user by enabling a debug for "WebLogic.EJB.security" can set the server debug MBean at Attribute A. If the user selects the MBean for "Weblogic.Security" the MBean attributes to the "Weblogic.Security" node can be set. In the example of FIG. 6B, setting server MBean attributes A, B and C.

Metadata can be selected by a user from previously defined metadata. In one embodiment, the metadata can be defined in an object such as a MBean.

In one embodiment, the debugs points can be turned on without restarting the server software.

FIG. 6B illustrates a case where the metadata is arranged using a hierarchical arrangement of nodes. In one embodiment, when a parent node is enabled all of the attributes associated with child nodes can be enabled as well. A debug point can be associated with more than one node of the debugscope tree.

One embodiment of the present invention are methods including using metadata to activate a group of debug points on server software; and collecting debug information from the debug points. The metadata identifying logical groupings of debug points to allow activation of the group of debug points. The metadata allows for the activation of logically grouped debug points across package boundaries.

A debugging system can use a declarative model. In one example, all the debug settings are known at compile time along with its documentation as opposed to APIs like Java Logging & Log4j where it is known only at runtime. Hierarchical control can be done using configurable Debug Scopes.

Watches and Notifications

One embodiment of the present invention is a method comprising: obtaining diagnosis information; using configured watch rules to determine whether to produce a notification, the stored watch rules being evaluated against the diagnosis information; and using configured notification types to determine the type of notification to be sent.

FIG. 7A illustrates a method of one embodiment of the present invention. In step 702 diagnostic information is obtained. The diagnostic information can be debug information or the like. In step 704, a configured watch ruler is used to determine whether to produce a notification. The configured watch rules can be used to examine the diagnosis information to check whether the watch rule is matched. If there is a match, a configured notification types can be used to determine the type of notification to be sent in step 706. The diagnostic information can be stored in memory such as in the volatile memory of a server software system. The watch rules can include be a compound rule including a number of primitive rules. The watch rules can be analogous to SQL searches. The notification catch can include email notifications, Java Messaging Service (JMS) notifications, and messages to queues, SMNP traps, log records, or the creation of a diagnostic image. Alternately the notification types can include a JMX notification. The watch rules can be stored in a file such as a config.XML file.

One embodiment of the present invention includes software comprising code to use configured watch rules to determine whether to produce a notification, the stored watch rules being evaluated against diagnosis information; and code to use a configured notification type to determine the type of notification to be sent.

One embodiment of the present invention is a method including a method comprising: obtaining diagnosis information; persisting the diagnosis information into at least two different types of archives; using an accessor component to interrogate the persisted diagnosis information in the at least two different types of archives according to watch rules.

FIG. 7B illustrates an example of one embodiment of the present invention including the steps of obtaining diagnosis information in step 710; persisting the diagnostic information to these two different type of archives in step 712; and, using an accessor of component to obtain the diagnosis information from at least of two different types of archives according to the watch rules, in step 714. The archives can include a database and flat files in which to log info or other information watch is stored. Looking again at FIG. 2, the server accessor 210 can access the archive 202 for different types of archive storage.

One embodiment of the present invention comprises software comprising code to persist diagnosis information into at least two different types of archives; and code to interrogate the persisted diagnosis information in the at least two different types of archives according to watch rules.

DETAILED DESCRIPTION OF ONE NON-LIMITING EXAMPLE

The following description gives one non-limiting implementation of a diagnostic framework. The discussion below gives one embodiment, but those skilled in the art will understand that other implementations of the above concepts can be done. Any potentially limiting language given below is to be interpreted in the context of the specific non-limiting implementation and is not meant to limit the general concepts.

Non-Limiting Example of Diagnostic Context

A Diagnostic Framework can provide a unified framework to gain visibility into the functioning of the server as well as applications running on it. It can consume, collate, archive and publish generated diagnostic information. In order to correlate different pieces of generated information, the generated diagnostics can capture contextual information. The contextual information can be maintained with respect to requests serviced by the Server. A request may cross thread and/or Java Virtual Machine (JVM) boundaries. A diagnostic context (DC) can capture required contextual information for the request. The diagnostic context can be created when a request enters the system and can be propagated to participating threads and virtual machines (VMs) as the request crosses thread or VM boundaries. Such context propagation can be handled by the underlying work area protocol machinery of implementation of the server software WLS. The diagnostic context can be available to various diagnostic modules, such as logging, tracing, etc so that they can record the contextual information. As requests enter the system and being serviced, different facilities provided by the Diagnostic Framework can generate diagnostic data, which can provide visibility into the working of the system. For example, messages may be logged using the logging system, or various diagnostic monitors woven into the system may record information as the request progresses. This activity is likely to generate volumes of information, which can be difficult to digest. For example, how does one correlate different log messages which were generated as part of the same request and isolate them from messages corresponding to other requests. Moreover, in a multi-threaded and distributed environment, requests may cross thread and VM boundaries. It can be important to correlate diagnostic information related to a request in that situation as well.

The diagnostic framework can use contextual information related to requests in the form of Diagnostic Context (DC). The Diagnostic Context can be made available to different facilities within diagnostic framework. These facilities such as logging, diagnostic monitors etc can tag generated information with contents of the diagnostic context. Thus, diagnostic information generated by them can be collated, filtered and correlated by external tools in a better way.

The diagnostic context can also make it possible to generate diagnostic information only when contextual information in the Diagnostic Context satisfies certain criteria. Thus, it can make it possible to keep the volume of generated information to manageable levels and keep the overheads of generating such information relatively low.

The machinery for creation and propagation of Diagnostic Context across threads and VMs can be addressed by the work area protocol. The diagnostic framework can participate in the initial creation and population of Diagnostic Context using facilities provided for the work area protocol. Thereafter, it can access the Diagnostic Context as needed using facilities provided for the work area protocol.

The Diagnostic Context can capture request specific information and provide an interface to access it. In one embodiment, it does not attempt to capture information which is already available elsewhere, such as user identity, transaction IDs, timestamps, etc.

As requests are serviced within the Server, different facilities within the diagnostic framework such as logging, diagnostic monitors etc may record the progress of the requests. To facilitate correlation of such information, these facilities can use contextual information related to the requests. For example, a unique context identifier for a request would be useful to correlate events and log entries generated as part of the same request. Apart from the context identifier, other information such as address of the originating client and some user definable flags would be useful to decide if certain diagnostic information needs to be generated at all.

The diagnostic context can be identified by a fixed name (such as weblogic.management.DiagnosticContext). Thus, it can be looked up using this name. Actual contextual data for the Diagnostic Context can be stored in the diagnostic context payload. The server software can perform context propagation with several protocols, such as HTTP, RMI, SOAP, T3, etc. The server software can also provide mechanism to identify and access a context using a key. The diagnostic framework can capture necessary contextual data needed by it. The diagnostic framework may also need other pieces of information such as identity of associated user, transaction identity, thread ID, timestamp, etc, while generating diagnostic information. These entities can be obtained from other existing sources. Therefore, the diagnostic context data need not duplicate it.

Propagation of diagnostic context can be potentially expensive. Therefore, it should be kept as compact as possible.

Diagnostic context can be created and populated when a request enters the system by the server software. Upon request entry, the server software can examine if a Diagnostic Context is included in the request. If so, it can be propagated. The server software can handle context propagation with several different protocols as mentioned above. If the Diagnostic Context is not included in the request, it can create a new context with specific name (such as weblogic.management.DiagnosticContext). The server software can instantiate a Diagnostic Context payload, which implements the DiagContext interface described later. The created Diagnostic Context can be populated with the Diagnostic Context payload. Thus, within the scope of a request execution, existence of the Diagnostic Context can be guaranteed.

In one embodiment, the Diagnostic Context is not created and initialized on request entry when diagnostic monitoring is not enabled.

The Diagnostic Context can capture necessary contextual information for a request during the life-cycle of a request. It can be created and initialized when a request enters the system, for example, when a client makes an HTTP request. Once created, diagnostic framework can retrieve the diagnostic context data from server software as needed. For example, the logging system can use this information while creating log records so that log entries for the same request can be correlated. Since the diagnostic context can be propagated as a request crosses thread and VM boundaries, it should be kept as small as possible. It can maintain the following information:

Context Id: This can be a unique identifier with which a request can be uniquely identified. It should be unique over the entire domain.

A bit vector of dye flags, which can be turned on or off based on certain conditions. Typically, they can be conditionally turned on by diagnostic monitors when a request enters the system. The business logic provided by advices associated with the monitors can dictate the conditions under which the dye flags can be turned on. Thereafter, other diagnostic monitors can inspect the dye setting and conditionally perform actions, such as generate events. The dye vector can contain 64 dye flags. Each dye flag can be independently read and written to.

In one embodiment, a Diagnostic Context is guaranteed to exist within the scope of a request execution. It can be accessed and used by different facilities such as logging and tracing systems. For example, log entries can emit the unique context identifier assigned to the request along with other data for easy correlation. Accessing context data can involve:

Obtain the Diagnostic Context from underlying work area protocol implementation, using its specific name (weblogic.management.DiagnosticContext).

Obtain the context payload from the context.

Access and use context payload attributes, using methods described in the DiagContext interface.

Requests can be dyed or specially marked to indicate that they are of special interest. For example, in a running system, it may be desirable to send a specially marked test request, which can be conditionally traced by the tracing monitors. This can allow creation of highly focused diagnostic information without slowing down other requests. The requests can be typically marked when they enter the system by setting flags in the Diagnostic Context. The Diagnostic Context can provide a number of flags (such as 64), which can be independently set or reset. Certain dyeing monitors can turn on these flags when the request enters the system.

Thereafter, other diagnostic monitors can make use of these flags (dyes) to conditionally execute certain actions. For example, tracing can be enabled if the tracing dye is present in the request.

Some dye bits can be made available to be used by applications. All other dye flags can be reserved for use by server software and libraries.

Pointcuts which identify the places where the diagnostic context created, should be defined to cover inbound requests. Following are some such places:

Inbound RMI calls

HTTP/HTTPS requests

Inbound t3 requests

Inbound connector requests, where work gets scheduled.

Following are exemplary criteria, which can be used to inject dyes into the DC at request entry:

Client IP address

Client user identity

Cookies in HTTP headers (for HTTP only)

Protocol based dyeing

Execute queues

Thread group

Different dye flags can be reserved to identify that a request satisfies on or more criteria described above. A special diagnostic monitor DyeInjectionMonitor can be provided to inject specific dyes in the context based on configured parameters.

Non-Limiting Example of Diagnostic Image

This details the functional specification of the Diagnostic Image facility of a Diagnostic Framework. It includes both the model for defining and registering important sources of diagnostic information and the specific mechanisms for capturing an image.

The diagnosis of almost all faults in the server begins with a few common diagnostic artifacts including the configuration file and the logfile. This is evidenced by the current support protocol of manually collecting these items from customers at the inception of most support calls. To improve both customers' total cost of ownership and to standardize and enhance the data collection process the Diagnostic Framework provides a Diagnostic Image facility. The Diagnostic Image support can gather the most common sources of server state used in diagnosing problems and packages that state into a single artifact that can be made available to support and may be fed into automated analysis. Further, the Diagnostic Image support can include both an on demand capture process, similar to the current manual process, and an automated capture based on some basic failure detection.

A Diagnostic Image can be a heavyweight artifact meant to serve as a server level state dump for the purposes of diagnosing significant failures. It provides on-the-spot data capture opportunities for an administrator who can be asked to provide state data to server software customer support. For regular system monitoring and localized fault detection, the standard data creators, harvester, and accessor components can be utilized. The Diagnostic Image is a bulky data set with no fine grained control or filtering support and creation of an image should not be a regular occurrence in most deployments.

Diagnostic Image management can be coordinated by a singleton Image Manager. For a component to participate in the Diagnostic Image capture process it must be can be defined as an Image Source and be registered with an Image Manager. A Diagnostic Image can be created by invoking the capture mechanism exposed on the Image Manager. Automated capture can be made possible by a basic First Failure detection mechanism. The Image Manager can be the singular and central resource for all Diagnostic Image handling. It can be a singleton in each process in which it is utilized. The Image Manager can provides additional functionality for Image Source registration and image capture as defined in subsequent sections of this document.

The Image Manager can be a singleton which is initialized on first reference. The ImageManager can provide a static accessor to acquire a reference to the singleton instance. In nearly all instances this can be when the first Image Source attempts to register during server startup as defined in the following section, but this is not a requirement.

The creation of a meaningful Diagnostic Image is reliant on the selection and definition of meaningful sources of state and their own contributions to the image. In one embodiment, these sources are made known to the Image Manager so that they may readily participate in an image capture.

To qualify as an Image Source a component can implement the ImageSource interface and therein must implement a method to stream its diagnostic image content out to a given output stream. The form and content of that image can be left to the specification of each component that wishes to define itself as an Image Source.

Each Image Source can register itself with the ImageManager by a String name which may be used subsequently to unregister the Image Source if necessary or to over-register a new instance in place of the current instance.

The Image Manager can determine that an Image Source has spent too much time creating its image and can send a timeout signal to the source. The source is not required to react immediately to the timeout but any work completed after the timeout signal may be disregarded. Further the Image Manager can choose to close the OutputStream provided to the Image Source at any time after a timeout call is made. This allows the Image Manager to gracefully handle Image Sources that may be compromised by the current failure state or that are exceeding defined performance requirements.

In one embodiment, it is assumed no Image Source can spend more than fifteen seconds writing its image content. Any exceptions may be subject to a timeout from the Image Manager and should be carefully considered for their suitability in the Diagnostic Image.

The definition and registration of Image Sources can be left to the component developers themselves. As such this feature's value is dependent on those identified subsystems defining the appropriate image sources in their subsystem and providing high quality well defined image content.

The presence of well defined Image Sources is only useful if a mechanism exists to request the capture of an image. The Image Manager can provide this support. The capture functionality may be invoked by a first failure detection, a configured watch notification, pushbutton functionality exposed in a diagnostic tool, or by a direct API call.

The ImageManager can provide an interface that allows for the capture of a Diagnostic Image. While creating the image the Image Manager invokes each Image Source that has been registered. If a particular Image Source fails the Image Manager can note this failure in the artifact and continue processing the remaining Image Sources. Finally, the Image Manager can add a summary artifact as detailed below.

If the image capture time is deemed too substantial for synchronous invocation, the capture implementation may choose to immediately return and manage the capture process asynchronously.

The ImageManager can provide a means of modifying the configured destination of the output image artifact. This value can be persisted and can survive server restart. The Image Manager can also provide for request level overrides of the destination directory with overloaded imageCapture methods. The request level override can supersedes the configured destination. If the Image Manager is unable to write to the specified directory or fails during writing an exception can be generated.

During initialization the ImageManager can test the configured destination directory for writability. If the test fails, an error message can be logged.

The Image Manager can include in each Diagnostic Image a summary artifact that can include, but not be limited to the following elements:
  Creation date and time of the image
  Source of the capture request
  Name of each Image Source included in the image and the time spent processing each of those Image Sources
  JVM and OS information if available
  Commandline arguments if available
  Networking muxer version if available
  WLS version including patch and build number information The creation of a Diagnostic Image may in fact be a costly exercise and as such it should be an infrequent task. Creating an image for each error detected is neither efficient nor likely more effective than a single image created on the first failure. Considering that errors are often clustered, a lockout period can be imposed prohibiting the Image Manager from creating a secondary image until after some timeout.

The default lockout can be a predetermined time period such as 15 minutes, but the interface can provide an override in which the lockout may be set higher or lower. In one embodiment, the lockout value is neither perpetuated nor persisted. Once the lockout time has passed, a capture request may be handled and its subsequent lockout can again be 15 minutes unless specified with another lockout override.

Capture requests that occur during a lockout can result in a CaptureLockoutException, which can be safely ignored unless in fact there is proof that no such image has been created, and can be disregarded. This functionality is necessary to avoid a cascade of errors generating many similar image artifacts.

If an image capture fails for any reason including I/O problems or a fatal error in a registered Image Source the lockout can not be set and the Image Manager can be immediately ready to handle another capture request.

A captured image can result in a single file artifact for the entire server which is uniquely named. More than one image artifact, with distinct names, may exist at a given time. In one embodiment, each image artifact is named as follows:
   diagnostic_image_domain_server_y-
      yyy_MM_dd_HH_mm_ss If for some reason, and it should be noted this is an extremely unlikely case (given that image creation should take more than one second) a new image defines an artifact name that is already in use it can result in a log message indicating the collision and can generate an image of the same name with an additional sequence number appended as follows:
   diagnostic_image_domain_server_y-
      yyy_MM_dd_HH_mm_ss_#

Where # represents the next available sequential number after all existing files with the same initial image name.

The Image Manager can log the beginning of the Diagnostic Image capture and the completion of the capture as two distinct events. The completion log message can include the time elapsed during image creation.

Notice that these messages make it possible, using the Watch and Notification capabilities of the Diagnostic Framework discussed below, to watch for these messages and create a notification, by email for example and that an image capture has occurred.

The console can expose a means of manually invoking an image capture including the option to override the destination of the image artifact. Notice that the ImageManager provides no support for selecting what data or which image sources might be included in an image and this interface likewise need not provide such controls.

The console can also wish to expose a link or download page that provides a list of known image artifacts and some metadata like creation data for a particular server suitable for download to the administrator's system.

A First Failure (prefailure) is a detection by the server that it is transitioning into a failure state. It may in fact recover from this state but this failure is the first of what may represent a chain of failures. As such a First Failure is a candidate to trigger the automatic creation of a Diagnostic Image.

An illustrative scenario is a server transitioning into a failed state in the middle of the night unmonitored and the NodeManager noting this state and restarting the server. The administrator can arrive the next day to find a restarted server and no artifact to indicate the state before the restart. For this reason the transition of a server into a failed state is a good First Failure candidate.

When a critical failure is detected a call to the fail mechanism on the FirstFailure interface can be made. This utility method abstracts the details of dispatching the capture call to the Image Manager and may very well be an asynchronous call.

A failure can be defined by the state of several metrics or health states in the server. The definition of these complex monitored states is handled by the Watch and Notification capabilities of the diagnostic framework. As such one possible notification handling mechanism might in fact be a trigger of the First Failure functionality. This notification handler type indicates richer means of defining First Failure detection and providing administrators with a way to automate image capture for conditions custom to their environment.

The value of the Diagnostic Image is a direct function of the Image Sources selected to contribute to the image. The list of expected Image Sources has not been finalized but can include:
   WorkManager state
   Configuration state
   Defined deployment plans
   Plug in configuration (if available)
   Log Cache (recently logged messages for all logs)
   State of all known Harvestable instances and their attributes
   JNDI dump
   JRockit JRA output file
   JVM state (thread dump, memory information, etc.)
   Native info (like file descriptor counts)

Automated Diagnostic Image creation can be driven by the detection of First Failure (prefailure) states. In addition to the transition of the server into a "failed" state there may be other candidates for First Failure detection.

Non-Limiting Example of Diagnostic Instrumentation

The Diagnostic Instrumentation System (DIS) can provide a flexible mechanism for selectively adding diagnostic code to server software and applications running on it. It can allow flexible selection of locations in the server and application code, at which such code is added. The process of adding diagnostic code can be deferred to the time of running the server at a deployment site. It also can allow flexible selection of diagnostic actions, which are executed at selected locations. Execution of the diagnostic code can be dynamically enabled or disabled while the server is running. Also, under certain circumstances, the behavior of the diagnostic code executed at such locations can be dynamically changed while the server is running.

Visibility into the working of a system is essential to make it supportable. It is desirable that diagnostic information on the system be available at runtime to identify problems in a running server. One way to provide this visibility is to build diagnostic code into the system itself during its design and development phase. However, manually scattering diagnostic code in the sources has some problems. Firstly, it is difficult to manage and update. Secondly, exposed visibility is limited to the program locations which were deemed interesting during development phase. If a problem surfaces elsewhere during production phase, the diagnostician has to resort to the cumbersome process of building and deploying debug patches, etc. This process is cumbersome. Therefore, it makes it difficult to identify and resolve transient problems in a server, which may be running for a long time.

The Diagnostic Instrumentation System can address this problem by providing a flexible mechanism to add diagnostic code at a post-build stage. The locations where diagnostic code can be added are called diagnostic joinpoints. The Diagnostic Instrumentation System allows identification of such diagnostic joinpoints with an expression in a generic manner. The set of joinpoints identified by such a generic expression is called a pointcut. The Diagnostic Instrumentation System can provide a mechanism to allow execution of specific diagnostic code at such pointcuts. The Diagnostic Instrumentation System adds such diagnostic code into the server and application code. Since this is done in a post-build stage, it is possible to tune it at a customer site according to specific needs. The diagnostic code itself can be selectively and dynamically enabled or disabled without restarting the server. Thus, it can be enabled only when problems need to be looked into. During normal operation, the diagnostic code can introduce little or no overhead.

Another motivation for the Diagnostic Instrumentation System is to provide a flexible instrumentation service to third party diagnostic tools vendors. Often, they resort to performing their own bytecode instrumentation, which is difficult to control from the server perspective. Also, their instrumentation tends to change the shape of Java classes. Thus, having multiple tools vendors doing their own instrumentation on the same classes can have unpredictable side effects. By providing the instrumentation service, the tools vendors can be encouraged to stay away from doing their own instrumentation and concentrate on providing higher level analytical functions.

The goal of the Diagnostic Instrumentation System is to provide late stage dynamism, that is, allow dynamic control over diagnostic code to be performed as late as the situation permits. It can be available to be used with all JVMs supported by the server software.

In one embodiment, the Diagnostic Instrumentation System does not change the semantics of the original classes or change program state when the diagnostic code runs. It need not introduce user-visible attributes, methods and interfaces to the classes.

Diagnostic code can be added in a post-build phase, e.g., at the customer site. Diagnostic code can be selectively added to specified points in the server and application code during deployment.

Diagnostic Instrumentation System can provide mechanism to selectively and dynamically control execution of diagnostic code, which can be enabled, disabled or in some cases, added or removed without restarting the server.

The Diagnostic Instrumentation System can provide a library of useful diagnostic monitors, which can be deployed at common pointcuts in server and application code.

The Diagnostic Instrumentation System can provide a library of suitable diagnostic advices which can be used in conjunction with diagnostic monitors to provide visibility into a running server.

Diagnostic Instrumentation System can make it possible to define custom diagnostic monitors, which can allow executing appropriate diagnostic advices from the advice library at user selectable points in the applications.

The Diagnostic Instrumentation System can be usable across different Java virtual machines. When underlying VM is JRockit, it can allow adding diagnostic code into selected classes without restarting the server or redeploying applications.

Similar to providing visibility into the server, the Diagnostic Instrumentation System can provide visibility into applications.

The Diagnostic Instrumentation System can provide a mechanism to add diagnostic code into the classes after the product is built. Thus, it can be possible to delay the decisions regarding what needs to be diagnosed. For example, it can be possible to specify and tune the diagnostic code that can be added to the system at the customer site. Appropriate diagnostic code can be typically added into the classes when they can be loaded into the system.

The Diagnostic Instrumentation System can work with the notion of Diagnostic Monitors. A Diagnostic monitor can be the unit of diagnostic code. It can identify the locations in the program where the diagnostic code can be added, as well as the diagnostic actions which can be executed at those points. The Diagnostic Instrumentation System can provide a library of useful diagnostic monitors. The Diagnostic Instrumentation System can weave the diagnostic monitors into server and application classes according to the Diagnostic Instrumentation System configuration.

Diagnostic monitors can be woven into different classes at different stages during a server life cycle. For eligible server classes, they can be woven when those classes are loaded into the VM. These classes need not be unloaded, so the added diagnostic code can always stay in these classes when the server is running. The diagnostic code can be removed from these classes by changing the Diagnostic Instrumentation System configuration and restoring the server. However, the Diagnostic Instrumentation System can allow such code to be enabled or disabled on demand. It can be possible to change the behavior of certain types of diagnostic monitors (Delegating Diagnostic Monitors).

Similar to server classes, diagnostic monitors can be woven into application classes. Diagnostic code can be added to such classes when they are loaded into the VM after applications are deployed. The Diagnostic Instrumentation System can allow such code to be enabled or disabled on demand; or in some cases, change its behavior. Diagnostic code in applications can be changed without necessarily restarting the server. For example, it can be changed by updating Diagnostic Instrumentation System configuration for the application and redeploying the application. When application classes are reloaded, the new Diagnostic Instrumentation System configuration can take effect.

JRockit VM allows replacement of class implementations in a running process. Therefore, when the server is running on a JRockit VM, diagnostic monitors can be re-woven into classes without restarting the server or redeploying applications. However, this functionality can be available only when underlying VM (e.g. JRockit) provides hot-swap functionality.

Although this feature provides functionality for late stage weaving, it should be noted that the process of weaving is potentially expensive. Therefore, using it pervasively can adversely affect server startup time, application deployment time, etc. The Diagnostic Instrumentation System will not preclude weaving diagnostic monitors at build time. If certain diagnostic monitors should always be in the code, it is better to weave them in at build time.

The process of weaving diagnostic monitors into server and application classes can be controlled with the instrumentation configuration, which can be part of the diagnostic framework configuration information. The weaving can happen when classes are loaded into the VM by different classloaders employed by the server. The Diagnostic Instrumentation System can control the weaving process within the scope of such classloaders. Weaving into server classes for a Server can be controlled by the instrumentation configuration scoped within that server. Weaving into application classes can be controlled by instrumentation configuration within the deployment descriptors of respective applications.

The instrumentation element can define the scope of instrumentation. All options specified within the element can be applicable only to classes within its scope. It has the following attributes:

include: Optional, comma separated regular expressions to identify classes within the scope, which will participate in the weaving process.

exclude: Optional, comma separated regular expressions to identify classes within the scope, which will not participate in weaving.

enable: If false, disable weaving while loading classes within the scope and disable all diagnostic monitors within the scope.

The instrumentation element associated with a server can dictate how the weaving will be performed for server classes for that server. The instrumentation elements in application deployment descriptors can dictate the weaving process within the scope of the applications. If the optional attribute "include" is specified, only classes whose names match given regular expressions will be affected during the weaving process. If the optional attribute "exclude" is specified, none of the classes matching with the given regular expressions will be affected.

Diagnostic monitors are manageable units of diagnostic code which can be applied to pointcuts. An instrumentation element may contain multiple diagnostic monitor elements, which specify the diagnostic activity within the scope. They can be of the following types:

standard-monitor: These diagnostic monitors can define specific diagnostic behavior at specific pointcuts.

delegating-monitor: These diagnostic monitors can define specific diagnostic pointcuts, where diagnostic activity will take place. The actual diagnostic activity can be specified by advice elements enclosed in them.

custom-monitor: These diagnostic monitors can allow definition of custom diagnostic pointcuts within the scope of applications. Actual diagnostic activity can be specified by advice elements enclosed in them.

Attributes of the monitor elements can be:
name: Display name of the monitor, used to identify the monitor for control purpose
type: Identifies the type of a standard or delegating monitor
pointcut: Identifies the pointcut for a custom monitor
enable: Identifies if the monitor is to be dynamically enabled.

Advice elements enclosed within delegating-monitor or custom-monitor elements can specify the diagnostic activity that will take place at pointcuts defined by the respective monitors. Attributes of the advice elements can be:
name: Display name of the advice, used for control purpose
type: Identifies the type of the advice
dye_mask: Controls dye filtering for the advice
properties: Stringified advice specific properties Following is a partial list of error messages that can be recorded in the log file:
Malformed instrumentation descriptor elements.
Specified monitor cannot be used with identified scope.
Specified monitor is not available in monitor library.
Specified advices are not available in advice library.
Incompatible advices vs. delegating monitors.

For certain diagnostic monitors, which can always be woven in, it would make sense to weave them at build time rather than at class load time. This is especially relevant for server classes. Weaving such monitors at build time would eliminate weaving overheads at runtime. An ant task to weave monitors at build time can be provided.

Changing classes can be perceived as an unacceptable security risk by some customers. The diagnostic instrumentation feature can be disabled by default, unless explicitly enabled by a command line option. Also, instrumentation configuration can be protected such that it can be altered only by users with an administrator role.

The Diagnostic Instrumentation System can capture weaving statistics and make it available for other components of WLDF for further processing. Some of the statistics can be:
Number of classes inspected for weaving
Number of classes modified
Minimum processing time for a class
Maximum processing time for a class
Total processing time spent in weaving activity Although late stage weaving is more flexible than build time weaving, it introduces weaving overheads, which can result in slower server startup times and application deployment times. If certain monitors should always be present, they should be woven in as part of the build process.

In one embodiment, after the diagnostic monitors are woven into a class at class loading time, their structure can not be altered unless the server is restarted or applications redeployed. However, the Diagnostic Instrumentation System can provide some dynamic control over them at run time. Such monitors can be dynamically enabled or disabled. In some cases, the behavior of such monitors can also be changed at runtime without restarting the server or redeploying an application.

Additionally, if the server is running on JRockit JVM, using its class hot-swap functionality, monitors can be rewoven into classes. It can allow swapping in and out diagnostic monitors on demand at runtime.

The Diagnostic Instrumentation System service level API can be exposed through InstrumentationManager service. Access to InstrumentationManager can be protected with WLS security framework, so that only authorized users will be able to use it. Broadly speaking, it can provide the following types of services:

The InstrumentationManager can provide functionality to query what features of the Diagnostic Instrumentation System are available in a particular installation. It can provide information on available monitors, available advices, configured monitors, etc.

The InstrumentationManager can provide functionality to enable or disable diagnostic monitors.

The InstrumentationManager can provide functionality to attach or detach an advice from the list of available advices to diagnostic monitors. When no advices are attached to a monitor, it can effectively become disabled.

This feature can be available when the underlying JVM is JRockit. It can allow weaving in monitors into specified classes on demand at runtime.

Any changes made at runtime can be persisted to the configuration so that when the server restarts, the changes can apply automatically. Thus, when monitors are enabled or disabled or when advices are attached or detached to monitors, the configuration can survive server restart.

The Diagnostic Instrumentation System can collect and publish its runtime metric information. The Diagnostic Instrumentation System can expose its runtime control API through the interface InstrumentationManager.

The Diagnostic Instrumentation System can provide a library of diagnostic monitors, which can perform common diagnostic functions. The Diagnostic Instrumentation System model is extensible in the sense that it can be easy to create new diagnostic monitors. However, adding additional code into server and application classes has security implications. The Diagnostic Instrumentation System can restrict itself to diagnostic monitors supported by the diagnostic framework. As new requirements come up, new diagnostic monitors can be developed.

Monitor implementations in one embodiment are tied to pointcuts. In other words, once a diagnostic monitor is created, it implicitly identifies the locations in the program which it affects. Some monitors can be applied to server classes only. Others can be applied to applications. The Diagnostic Instrumentation System can make a distinction between monitors which apply to server classes and those which apply to application classes.

Different categories of diagnostic monitors are supported by the Diagnostic Instrumentation System. Diagnostic monitors can have two components. The pointcuts used by them identify the locations affected by them. The business logic, or the advices specify the diagnostic activity that takes place at those locations. A standard monitor uses a fixed pointcut and provides a fixed advice. Thus, both components are specified by the developer of the standard monitor. Delegating monitors can use a fixed pointcut. However, their advices can be configurable by an administrator. A custom monitor can allow an administrator to define a pointcut and configure advices to be used with it. Following table summarizes the different categories of diagnostic monitors of one embodiment.

| Monitor Category | Pointcut | Advice |
| --- | --- | --- |
| Standard Monitor | Fixed | Fixed |
| Delegating Monitor | Fixed | Configurable |
| Custom Monitor | Configurable | Configurable |

The Diagnostic Instrumentation System can provide following categories of diagnostic monitors.

Standard Monitors

The standard monitors in the diagnostic monitor library can perform specific diagnostic functions at specific pointcuts. In other words, they can identify the locations in the program which can be affected by the weaving process. At the same time, they define the actual diagnostic functionality, which can be performed at those locations. Once woven in, they can be dynamically enabled or disabled at runtime. However, their behavior does not change. A standard monitor in the library is known by its type. A standard monitor of a particular type can be applied to more than one scope (e.g., application). However, within a scope, a standard monitor of a particular type can be applied at most once. At runtime, active standard monitors can be identified by their scopes and display names.

When standard monitors are disabled at runtime, they introduce minimal performance overhead. In order to remove them completely from an application scope, it can be necessary to remove them from the configuration and redeploy the application. To remove a standard monitor completely from server scope, it can be necessary to remove it from the configuration and restart the server.

Following is the list of standard monitors in the diagnostic monitor library. Note that, this list is likely to grow as more diagnostic requirements surface from subsystems.

DyeInjectionMonitor

This diagnostic monitor can be responsible for injecting dyes into the diagnostic context when requests enter the system. It can apply to pointcuts which identify code in server classes, which handles incoming requests. This monitor can be available only for the server scope. When enabled, it can set certain dye flags in the Diagnostic Context based on its configuration properties and certain request attributes. In one embodiment, the Diagnostic Context contains a dye vector, which contains 64 dye flags. Dye flags [56 . . . 63] are available for application use. Dye flags [0 . . . 55] are reserved for diagnostic framework use. Following table describes the dye flags which are set when request characteristics satisfy certain criteria in one embodiment.

| Dye Index | Criterion | Condition |
| --- | --- | --- |
| 0 | Client Address | matches value of property ADDR0 |
| 1 | | matches value of property ADDR1 |
| 2 | | matches value of property ADDR2 |
| 3 | | matches value of property ADDR3 |
| 4 | User identity | matches value of property USER0 |

-continued

| Dye Index | Criterion | Condition |
| --- | --- | --- |
| 5 | | matches value of property USER1 |
| 6 | | matches value of property USER2 |
| 7 | | matches value of property USER3 |
| 8 | Value of cookie named "weblogic.wldf.dye" (HTTP only) | matches value of property COOKIE0 |
| 9 | | matches value of property COOKIE1 |
| 10 | | matches value of property COOKIE2 |
| 11 | | matches value of property COOKIE3 |
| 12 | Execute queue name | matches value of property EXECQ0 |
| 13 | | matches value of property EXECQ1 |
| 14 | | matches value of property EXECQ2 |
| 15 | | matches value of property EXECQ3 |
| 16 | Thread group name | matches value of property THREADGROUP0 |
| 17 | | matches value of property THREADGROUP1 |
| 18 | | matches value of property THREADGROUP2 |
| 19 | | matches value of property THREADGROUP3 |
| 20 | Request protocol | T3 |
| 21 | | HTTP |
| 22 | | RMI |
| 23 | | SOAP |
| 24 | | IIOP |
| 25 | | JRMP |
| 25 | | SSL |

If the property is not specified, corresponding dye flag is not set. The cookie is checked only for HTTP requests. If it does not exist, corresponding dye flag is not set. The dye vector flags can be set on request entry only when this monitor is deployed in a server scope and is enabled. It captures certain request characteristics and is carried through the diagnostic context.

The dye vector in the Diagnostic Context can be accessed and used by diagnostic advices described later in this document. If a dye mask is specified with the advices, they can execute their diagnostic action only if the dye vector in the Diagnostic Context is consistent with the dye mask configured for the advice.

The DyeInjectionMonitor diagnostic monitor can make it possible to selectively perform diagnostic actions only on requests which match above criteria. It can keep the volume of generated diagnostic information to manageable levels, and also allow diagnosis of selected requests without slowing down all other requests in a production system.

HttpSessionDebugMonitor

This monitor can help diagnose problems with HTTP sessions in a development environment. It is not intended for production environment. It can be applied to an application scope. When deployed and enabled, it can affect following pointcuts in the applications.

Just after a new session is returned.
Just after an attribute is added to the session.
Just after an attribute is removed from the session At affected locations, it can display the size of the session to stdout. If the session contains non-serializable data, an error message can be displayed to stdout as well.

Delegating Monitors

The delegating monitors in the diagnostic monitor library are a more flexible version of the standard monitors. They can affect specific pointcuts. However, they do not define specific diagnostic activity at affected locations by themselves.

Instead, they provide empty shells so that different diagnostic advices implementing specific functionality can be plugged into them. Diagnostic advices are described later in this document.

Delegating monitors can provide an extra level of dynamism. Similar to standard monitors, they can be enabled or disabled at runtime without restarting the server or redeploying applications. Additionally, their diagnostic behavior can be changed by changing the set of diagnostic advices associated with them. Such change in diagnostic behavior can be achieved without server restart or application redeployment. Moreover, multiple diagnostic advices can be plugged into them at the same time. Divergent diagnostic functions can be executed at the same locations, without affecting each other. When multiple advices are attached to a delegating monitor, they can be executed in the same order in which they are registered with the monitor.

Implementation of delegating monitors may have certain structural requirements. For example, some monitors may affect locations at method entries. Other may affect method entries as well as exits. Consequently, they may require that they can be used with only certain types of advices from the advice library. In other words, there is a notion of compatibility among delegating monitors and their associated advices. With a particular delegating monitor, only compatible advices may be used.

Delegating monitors can work on certain standard pointcuts such as J2EE pointcuts for applications. When delegating monitors are disabled at runtime, they can introduce minimal performance overhead. In order to remove them completely from an application scope, they can be removed from the configuration and the application redeployed. To remove a delegating monitor completely from server scope, it can be necessary to remove it from the configuration and restart the server.

Following is a list of delegating monitors in the diagnostic monitor library. Note that, this list is likely to grow as more diagnostic requirements surface from subsystems. Although delegating monitors defined in the following tables are scoped to applications, server scoped delegated monitors are not precluded.

Following table lists exemplary monitors that can execute diagnostic advices before the joinpoints covered by their pointcuts are reached. When enabled, they can execute all attached advices. Only advices of compatible types may be attached with the monitors, as indicated in the table.

| Monitor Name | Scope | Compatible Advice Type | Pointcuts |
| --- | --- | --- | --- |
| Servlet_Before_Service | Application | Stateless Action | At method entries of servlet/jsp methods:<br>HttpJspPage._jspService<br>Servlet.service<br>HttpServlet.doGet<br>HttpServlet.doPost<br>Filter.doFilter |
| Servlet_Before_Session | Application | Stateless Action | Before calls to servlet methods:<br>HttpServletRequest.getSession<br>HttpSession.setAttribute/putValue<br>HttpSession.getAttribute/getValue<br>HttpSession.removeAttribute/removeValue<br>HttpSession.invalidate |
| Servlet_Before_Tags | Application | Stateless Action | Before calls to jsp methods:<br>Tag.doStartTag<br>Tag.doEndTag |
| JNDI_Before_Lookup | Application | Stateless Action | Before calls to javax.naming.Context lookup methods<br>Context.lookup* |
| JMS_Before_TopicPublished | Application | Stateless Action | Before call to methods:<br>TopicPublisher.publish |
| JMS_Before_MessageSent | Application | Stateless Action | Before call to methods:<br>QueSender.send |
| JMS_Before_AsyncMessageReceived | Application | Stateless Action | At entry of methods:<br>MessageListener.onMessage |
| JMS_Before_SyncMessageReceived | Application | Stateless Action | Before calls to methods:<br>MessageConsumer.receive* |
| JDBC_Before_GetConnection | Application | Stateless Action | Before calls to methods:<br>Driver.connect<br>DataSource.getConnection |
| JDBC_Before_CloseConnection | Application | Stateless Action | Before calls to methods:<br>Connection.close |
| JDBC_Before_CommitRollback | Application | Stateless Action | Before calls to methods:<br>Connection.commit<br>Connection.rollback |
| JDBC_Before_Statement | Application | Stateless Action | Before calls to methods:<br>Connection.prepareStatement<br>Connection.prepareCall<br>Statement.addBatch<br>RowSet.setCommand |
| JDBC_Before_Execute | Application | Stateless Action | Before calls to methods:<br>Statement.execute*<br>PreparedStatement.execute* |

-continued

| Monitor Name | Scope | Compatible Advice Type | Pointcuts |
|---|---|---|---|
| EJB_Before_SessionEjbMethods | Application | Stateless Action | At entry of methods: SessionBean.setSessionContext SessionBean.ejbRemove SessionBean.ejbActivate SessionBean.ejbPassivate |
| EJB_Before_SessionEjbSemanticMethods | Application | Stateless Action | At entry of methods: SessionBean.ejbCreate SessionBean.ejbPostCreate |
| EJB_Before_SessionEjbBusinessMethods | Application | Stateless Action | At entry of all SessionBean methods, which are not standard ejb methods. |
| EJB_Before_EntityEjbMethods | Application | Stateless Action | At entry of methods: EnitityBean.setEntityContext EnitityBean.unsetEntityContext EnitityBean.ejbRemove EnitityBean.ejbActivate EnitityBean.ejbPassivate EnitityBean.ejbLoad EnitityBean.ejbStore |
| EJB_Before_EntityEjbSemanticMethods | Application | Stateless Action | At entry of methods: EnitityBean.set* EnitityBean.get* EnitityBean.ejbFind* EnitityBean.ejbHome* EnitityBean.ejbSelect* EnitityBean.ejbCreate* EnitityBean.ejbPostCreate* |
| EJB_Before_EntityEjbBusinessMethods | Application | Stateless Action | At entry of all EnitityBean methods, which are not standard ejb methods. |
| MDB_Before_MessageReceived | Application | Stateless Action | At entry of methods: MessageDrivenBean.onMessage |
| MDB_Before_SetMessageDrivenContext | Application | Stateless Action | At entry of methods: MessageDrivenBean.setMessageDrivenContext |
| MDB_Before_Remove | Application | Stateless Action | At entry of methods: MessageDrivenBean.ejbRemove |
| TX_Before_Start | Application | Stateless Advice | At entry of methods: UserTransaction.begin |
| TX_Before_Commit | Application | Stateless Advice | At entry of methods: UserTransaction.commit |
| TX_Before_Rollback | Application | Stateless Advice | At entry of methods: UserTransaction.rollback |
| BeforeJCAMonitor | Application | Stateless Advice | Before calls to JCA methods: ConnectionFactory.getConnection Connection.close |

Following table lists exemplary monitors that can execute diagnostic advices after the joinpoints covered by their pointcuts. When enabled, they can execute all attached advices. Only advices of compatible types may be attached with the monitors, as indicated in the table.

| Monitor Name | Scope | Compatible Advice Type | Pointcuts |
|---|---|---|---|
| AfterEntityBeanMethodsMonitor | Application | StatelessAdvice | At exit of entity bean methods: setEntityContext unsetEntityContext ejbRemove ejbActivate ejbPassivate ejbLoad ejbStore |
| AfterEntitySemanticMethodsMonitor | Application | StatelessAdvice | At exit of entity bean methods: setters getters findByPrimaryKey |

-continued

| Monitor Name | Scope | Compatible Advice Type | Pointcuts |
|---|---|---|---|
| AfterEntityBusinessMethodsMonitor | Application | StatelessAdvice | ejbFind methods<br>ejbHome methods<br>ejbSelect methods<br>ejbCreate methods<br>ejbPostCreate<br>At exit of all public entity bean methods not covered by<br>BeforeEntityBeanMethods and BeforeEntitySemanticMethods. |
| AfterJCAMonitor | Application | StatelessAdvice | After calls to JCA methods:<br>ConnectionFactory.getConnection<br>Connection.close |
| AfterJDBCConnectionMonitor | Application | StatelessAdvice | After calls to JDBC methods:<br>Driver.connect<br>DataSource.getConnection<br>Connection.commit |
| AfterJDBCExecuteMonitor | Application | StatelessAdvice | After calls to JDBC methods:<br>Statement.execute*<br>PreparedStatement.execute* |
| AfterJDBCStatementMonitor | Application | StatelessAdvice<br>StringArgumentAdvice | After calls to JDBC methods:<br>Connection.prepareStatement<br>Connection.prepareCall<br>Statement.addBatch |
| AfterJMSMonitor | Application | StatelessAdvice | After calls to JMS methods:<br>TopicPublisher.publish<br>QueueSender.send<br>MessageConsumer.receive*<br>At entry of following methods:<br>MessageListener.onMessage |
| AfterMDBMonitor | Application | StatelessAdvice | At method exits of MDB methods:<br>MessageDrivenBean.setMessageDrivenContext<br>MessageDrivenBean.ejbRemove |
| AfterServletServicesMonitor | Application | StatelessAdvice | At method exits of servlet/jsp methods:<br>HttpJspPage._jspService<br>Servlet.service<br>Filter.doFilter |
| AfterServletSessionMonitor | Application | StatelessAdvice | After calls to servlet methods:<br>HttpServletRequest.getSession<br>HttpSession.setAttribute<br>HttpSession.getAttribute<br>HttpSession.removeAttribute<br>HttpSession.removeValue<br>HttpSession.invalidate |
| AfterServletTagsMonitor | Application | StatelessAdvice | After calls to jsp methods:<br>Tag.doStartTag<br>Tag.doEndTag |
| AfterTxMonitor | Application | StatelessAdvice | After calls to UserTransaction methods:<br>begin<br>commit<br>rollback |

Following table lists exemplary monitors that can execute diagnostic advices around the joinpoints covered by their pointcuts. When enabled, they can execute all attached advices. Only advices of compatible types may be attached with the monitors, as indicated in the table.

| Monitor Name | Scope | Compatible Advice Type | Pointcuts |
|---|---|---|---|
| AroundEntityBeanMethodsMonitor | Application | AroundAdvice | At entry and exit of entity bean methods:<br>setEntityContext<br>unsetEntityContext<br>ejbRemove<br>ejbActivate<br>ejbPassivate<br>ejbLoad<br>ejbStore |

-continued

| Monitor Name | Scope | Compatible Advice Type | Pointcuts |
| --- | --- | --- | --- |
| AroundEntitySemanticMethodsMonitor | Application | AroundAdvice | At entry and exit of entity bean methods:<br>setters<br>getters<br>findByPrimaryKey<br>ejbFind methods<br>ejbHome methods<br>ejbSelect methods<br>ejbCreate methods<br>ejbPostCreate |
| AroundEntityBusinessMethodsMonitor | Application | AroundAdvice | At entry and exit of all public entity bean methods not covered by BeforeEntityBeanMethods and BeforeEntitySemanticMethods. |
| AroundJCAMonitor | Application | AroundAdvice | Before and after calls to JCA methods:<br>ConnectionFactory.getConnection<br>Connection.close |
| AroundJDBCConnectionMonitor | Application | AroundAdvice | Before and after calls to JDBC methods:<br>Driver.connect<br>DataSource.getConnection<br>Connection.commit |
| AroundJDBCExecuteMonitor | Application | AroundAdvice | Before and after calls to JDBC methods:<br>Statement.execute*<br>PreparedStatement.execute* |
| AroundJDBCStatementMonitor | Application | AroundAdvice | Before and after calls to JDBC methods:<br>Connection.prepareStatement<br>Connection.prepareCall<br>Statement.addBatch |
| AroundJMSMonitor | Application | AroundAdvice | Before and after calls to JMS methods:<br>TopicPublisher.publish<br>QueueSender.send<br>MessageConsumer.receive*<br>At entry of following methods:<br>MessageListener.onMessage |
| AroundMDBMonitor | Application | AroundAdvice | At method entry and exits of MDB methods:<br>MessageDrivenBean.setMessageDrivenContext<br>MessageDrivenBean.ejbRemove |
| AroundServletServicesMonitor | Application | AroundAdvice | At method entry and exits of servlet/jsp methods:<br>HttpJspPage._jspService<br>Servlet.service<br>Filter.doFilter |
| AroundServletSessionMonitor | Application | AroundAdvice | Before and after calls to servlet methods:<br>HttpServletRequest.getSession<br>HttpSession.setAttribute<br>HttpSession.getAttribute<br>HttpSession.removeAttribute<br>HttpSession.removeValue<br>HttpSession.invalidate |
| AroundServletTagsMonitor | Application | AroundAdvice | Before and after calls to jsp methods:<br>Tag.doStartTag<br>Tag.doEndTag |
| AroundTxMonitor | Application | AroundAdvice | Before and after calls to UserTransaction methods:<br>begin<br>commit<br>rollback |

Custom Monitors

The standard and delegating monitors can work on specific standard pointcuts identified during their development. They may satisfy most of the diagnostic requirements. However, there can be situations when diagnostic code needs to be added at specific methods in application classes. Custom monitors provide the means to execute diagnostic advices at locations in application code. These locations can be identified while configuring custom monitors by specifying appropriate pointcuts. As part of defining a custom monitor, following information can be required:

name: Display name of the custom monitor, which can be used for control purposes.

scope: Identify the application scope to which the monitor can apply.

pointcut: An expression, which identifies the set of locations in the applications which can be affected.

compatibility: Type of compatible advices advice: The diagnostic advice that can be executed at the pointcut.

The pointcut syntax can identify a method execution location, or a method callsite location.

Custom monitors can be enabled or disabled at runtime. When disabled, they can introduce minimal performance overhead. In order to remove them completely, they can be removed from the configuration and the application redeployed. Similarly, a newly configured or updated custom monitor can take effect only after the application is redeployed.

A custom monitor can accept only advices of compatible types. Depending on the advice, it can be executed before, after or around the joinpoints identified by the pointcut. Custom monitors can be available only for application scopes. That is, in one embodiment, the Diagnostic Instrumentation System does not allow custom monitors to be used with server classes in production mode. However, custom monitors may be made available to server developers to be used on server code in development mode.

As described above, the delegating and custom monitors only identify the locations where diagnostic activity takes place. However, they do not provide the diagnostic functionality of their own. The diagnostic functionality is provided by the diagnostic advices, which can be attached to the delegating or custom monitors. the Diagnostic Instrumentation System can provides a library of diagnostic advices which can be used with the delegating monitors provided in the monitor library.

Depending on the functionality of an advice, it may need certain environment to do its job. Such environment is provided by the delegating monitor to which it is attached. Therefore, diagnostic advices can be used only with compatible monitors. Diagnostic advices are classified by their types. Such types are used to identify compatibilities by the diagnostic instrumentation system.

The Diagnostic Instrumentation System can allow using only advices only from the advice library and not any arbitrary code. However, diagnostic framework developers can easily add new advices as new requirements surface. For security reasons, dynamic addition to advice and monitor libraries need not be supported.

In one embodiment, the diagnostic activity of an advice can be executed only if certain filtering conditions are met, based on the dye vector in the diagnostic context. The dye vector can be typically set by the DyeInjectionMonitor diagnostic monitor at the request entry. The dye vector carries request characteristics as the request progresses through its execution path.

If dye filtering for the advice is disabled, the business logic of the advice is unconditionally executed.

Otherwise, the current dye vector in the diagnostic context must be consistent with the dye mask configured with the advice. In one embodiment, the business logic of the advice can be executed only if the dye vector in the Diagnostic Context satisfies the following condition:

(dye_mask & dye_vector=dye_mask)

By properly configuring and deploying the DyeInjectionMonitor and configuring the dye mask of the advice, the diagnostic advices can be executed only for requests of special interests. For example, a test request for a test machine can be fired and its progress can be analyzed. This can facilitate quick analysis of diagnostic data. It can also ensure that other requests are not slowed down by diagnostic activity.

Configuring the dye masks of individual advices can be a tedious task. To simplify matters, the InstrumentationManager can provide helper methods to set the dye masks in generic manner.

The Diagnostic Instrumentation System advice library can contain following exemplary diagnostic advices.

Trace2LogAdvice

This advice can cause a trace log entry to be made in the server log. Its type is StatelessAdvice. The advice implementation can interface with the logging system. The log entry can contain:
 TRACE tag
 [Trace2Log] advice-name
 Context identifier from the Diagnostic Context which uniquely identifies the request
 Thread id
 User identity
 Timestamp
 Identification of location from where the advice got executed InvocationCounterAdvice The type of this advice is StatelessAdvice. This advice computes the invocation counts of associated joinpoints. As the program executes, it can gather invocation count information in its repository. Collected data in its repository can be exposed to the diagnostic framework harvester using the HarvestableDataSource interface. Thus, collected information can be further processed.

DisplayArgumentsAdvice

The type of this advice is StatelessAdvice. When executed, this advice can create entries in the server log file, which can display arguments passed into the joinpoint, if any.

ElapsedTimeAdvice

The type of this advice is AroundAdvice. When executed, it captures the timestamp before and after the execution of associated joinpoint. It then computes the elapsed time by computing the difference. Its runtime registry can gather certain statistical information such as total elapsed time, average elapsed time, invocation count. Collected information is exposed to the harvester using the HarvestabledataSource. Thus, collected information can be further processed.

TraceElapsedTimeAdvice

The type of this advice is AroundAdvice. When executed, this advice captures the timestamps before and after the execution of associated joinpoint. It then computes the elapsed time by computing the difference. It can create a log entry in server log with following information:
 TRACE tag
 [TraceElapsedTime] advice-name
 Context identifier from the Diagnostic Context which uniquely identifies the request
 Thread id
 User identity
 Timestamp at entry
 Elapsed time in milliseconds
 Identification of location from where the advice got executed StackDumpAdvice The type of this advice is StatelessAdvice. When executed, by default, this advice can print the stack dump on stdout. If the FIRST_CALL_ONLY property is set to true, the advice can dump stack trace only on the first call to the joinpoint.

MemoryStatisticsAdvice

The type of this advice is StatelessAdvice. When executed, this advice can display information about current, total and maximum memory available to the JVM to stdout.

Most of the functionality provided by the Diagnostic Instrumentation System can be portable to all popular JVMs. It can do so by adding diagnostic code during class load time, which can be implemented in a JVM independent manner. Most JVMs do not support changing classes after they have been loaded. Therefore, with most JVMs, changes to classes after class-loading are possible only if the applications are redeployed.

JRockit VM can provide hot-swap functionality. This can allow the Diagnostic Instrumentation System to provide optimizations to change diagnostic code into selected classes even after they are loaded. This functionality can be available only for classes within the application scopes.

This functionality can allow weaving specific diagnostic monitors into a specific application class within application scopes. When this functionality is available, the InstrumentationManager described above can allow re-weaving and hot-swapping the class without a server restart or redeployment. For example, a custom monitor can be configured; the class can be re-woven and hot-swapped using the functionality in the InstrumentationManager while the server is running.

Similar to diagnostic support for server code, the Diagnostic Instrumentation System can provide diagnostic support for applications. It can be controlled by defining instrumentation scopes which are scoped to the application. Diagnostic monitors specified in the instrumentation scope can be woven into the application classes when they are loaded. It can be possible to update such diagnostic code by changing the instrumentation configuration and redeploying the application.

Non-Limiting Example of Debug

This document defines an exemplary framework to be built to provide support for better debugability for the diagnosis of problems or symptoms occurring in a live server. The information in the server logs is sometimes not sufficient to provide insight into the cause of the problem. Certain debug settings can be applied, capture the output and once the problem cause is determined disable the Debug when normal operations are resumed. These actions can be executed without incurring any system downtime or significant degradation in performance.

Debugging is a low tech, but simple and effective solution in lot of cases to provide better input to the Support, Engineering folks as well as Server System Administrator. It helps in figuring out what might be happening in a situation where traditional debugging through the Integrated Development Environment (IDE) is not available, as in a production deployment. Typical debug output can dump additional state information, not included in the normal server logs. The state could include the execution point in the program flow, the values of the parameters being passed or the interim state of objects in a transaction. These snapshots help to reconstruct the scenario causing the problem and can lead to quicker solutions.

Debugging capability can refer here to the capability to emit some type of instrumented output that can include details about the current state, so that further analysis can be done to figure out the actual problem.

A ServerDebugMBean can be used as a standard interface for defining debugging options that are configurable and persisted across server sessions. Client side debug configuration cam be defined using the KernelDebugMbean interface. We can also define a grouping scheme so that ServerDebugMBean attributes can be easily navigated and selected, because the number of attributes is expected to grow dramatically as this approach is used throughout the server software. In addition debug output can be controllable depending on the presence of the Diagnostic Context.

The Debug Provider API can define a lightweight interface that can be used for debugging throughout the server software codebase. This can guarantee that the debug output is formatted consistently and ends up in a standard location.

The ServerDebugMBean and KernelDebugMBean attributes can be used to define debug flags that enable or disable a specific type of debug output. All such debug attributes can be declared as dynamic using the @dynamic metadata tag. This can be the standard approach for introducing debug code in the server product. Other methodologies that exist today can be replaced in favor of the uniform approach being proposed here. When defining debugging code in the code base, careful thought must be given to ascertain whether this debugging is useful for diagnosing future problems. The question to be asked is whether this debug would be helpful to the Support Engineers, call center employees and server users in determining the cause of a problem they are facing and exposed appropriately using the mechanisms defined here. When the diagnostic context is available, it can be used to control the debug output for requests meeting a certain criteria based on User identity, Protocol, Client IP Address etc.

Other debugging code using DebugCategory, command line switches, java system properties etc can be migrated to using the ServerDebugMBean attributes. This can lead to an attribute explosion on the ServerDebugMBean which the users can find it difficult to navigate through. A grouping scheme can help users drill down to the desired debug control easily without being required to have the knowledge of a specific flag in the context of a particular problem. In order to address this issue, the debug flag needs to be arranged in a tree like structure. To introduce a terminology we can call this a tree of "DebugScope" nodes. Each DebugScope node can contain other DebugScope nodes and ServerDebugMBean attributes thus forming a tree like structure. The leaves of this DebugScope tree would be the ServerDebugMBean attributes. Each DebugScope node can be identified by a fully qualified name with the period delimiter being used to specify the node name of successive children down the tree path.

Since client side debug flags are probably not as numerous as compared to the server side flags, the grouping scheme need not apply to the KernelDebugMBean interface. Nevertheless all client side debug flags can be defined as an attribute on the KernelDebugMBean, so that Support has access to all the available debug settings in a single place.

A DebugScope specifies the aspects of a particular kind of debugging output. A DebugScope defines a hierarchical namespace for the debug parameters. In addition a scope can contain other child scopes. Each DebugScope node can contain other DebugScope nodes and ServerDebugMBean attributes as leaf nodes. A ServerDebugMBean attribute can be mapped to more than one node in the debug tree. For example a ServerDebugMBean attribute to debug servlets can be mapped to the DebugScope nodes weblogic.applications.webapp as well as weblogic.protocol.http. The DebugScope tree definition can be static in nature, defined declaratively using javadoc metadata tags in the ServerDebugMBean.java source file and created during the build process. This can be available in a read-only mode when the server is running. To draw an analogy to the file system on a computer disk, the DebugScope nodes are equivalent to directories which can contain child Debug Scopes just like sub-directories. ServerDebugMBean attributes are equivalent to files. A single attribute can be placed under more than one DebugScope node just like a symlink.

To illustrate the DebugScope "weblogic.ejb" is parent to "weblogic.ejb.cache", "weblogic.ejb.security" and "weblogic.ejb.locking" This would enable users to enable/disable debugging at any desired level of the hierarchy. If they enable debugging for weblogic.ejb all the child scopes would be enabled for example cache, security and locking. Or if the users choose to they can just enable/disable the specific ones they are interested in to a finer level of granularity. This hierarchical arrangement of the debug settings in a naming scheme means that the users need not know upfront whether the problem is in caching, security or locking. They can control the settings at a higher level, but on the other hand if they have some insight into a narrow area where the problem may lie, a finer scope may be selected. Also the users do not have to be confronted with umpteen attributes, instead they can navigate through a tree control based visual representation which the WebLogic Console can provide.

DebugScope is higher levels construct that maps to lower level ways of controlling debugging like ServerDebugMBean attributes. When a particular DebugScope is selected it can select its entire child Debug Scopes and the associated ServerDebugMBean attributes down the tree. By creating a higher level construct over the existing ServerDebugMBean attributes we can be able to present the users with a single view into our debugging mechanisms. Users can have a coarse grained view of the Debug Scopes which they can drill down into if they want.

The Diagnostic Context can be used to further control the debug output. Users can have the additional capability of specifying that debugging output be emitted only for dyed requests. For example users may have configured DebugEJBCache to be enabled and they want the debug to emit only for requests that match a specific user identity. This way the volume of debugging information generated is low and can be easily consumed for diagnosis purposes. Context based debugging is not enabled by default; debug can be emitted for all requests. The context based debugging provides a throttling mechanism to limit the volume of debug information in the log files.

Here is an illustration of how we can define the metadata for the ServerDebugMBean attributes to declare where they show up in the tree of Debug Scopes. The DebugScope node to which an attribute belong can be specified by the @debugScope javadoc metadata tag. Multiple @debugScope tags can be defined for an attribute, so that it can show up under more than one nodes in the tree. The interface can be processed to create a static debugscope tree during the build phase. The documentation for the debugscopes can be defined at the class level using @debugScopeDoc tags. The interface also includes a configurable switch that enables or disables context based debugging and a mask value that defines the criteria when debug is enabled for dyed requests.

The configuration of debug settings can be persisted in the same way as all other MBean attributes. A service level ServerDebugService API can be provided to navigate the DebugScope tree and support for enabling or disabling at the DebugScope node as well as the attribute level. An instance of this interface can be retrieved by invoking the DiagnosticService interface for a given server.

The debugging output can be in the same location as the server log, this makes it easier for them to consume this information. The debug messages can be formatted in a standard way and includes other related information like the current thread id, user id, transaction id and the context correlation id. The debug output can be throttled by an administrator so that it is emitted only for requests meeting a specified criterion.

The Debug Provider API defined by the DebugLogger interface can be used by server Subsystems throughout the code base to emit debug output for both client and server sides. Users can get a reference to the DebugLogger by name that can appear in the server logs as the subsystem name. This can help segregate the debug messages coming from a specific named instance of a DebugLogger. The DebugLogger can provide a final method to check the state of the debug flag which can use cached values updated through JMX AttributeChangeNotifications. The check can also evaluate the Diagnostic Context when context based debugging is enabled.

The DebugLogger API can provide a factory method for getting an instance by name and methods to emit debug output to the log. In addition, it can provide methods to check whether corresponding the debug flag is enable. This check can evaluate the value of the MBean attribute and the Diagnostic Context when available.

The root level node for the DebugScope can be statically defined to be a name such as "weblogic". Subsystems can define their own nodes reflecting the subsystem organization that exists for example we could have nodes like "weblogic.ejb", "weblogicjms" OR weblogic.management for EJB, JMS and OA&M respectively. Under each subsystem additional nodes can be defined using functionality rather than strict package layout in the source tree.

Debug Check Pseudo-code

```
// The debug check inside DebugLogger.isDebugEnabled( ) can look like
// this. In the normal case when a debug flag is disabled it can evaluate
// only one boolean value and can be efficient. When debug is enabled
// though it can additionally check another boolean value for the context.
// Only when the context based debug is ON we go to the Context to
retrieve the dye mask and check against the criteria to limit the debug
if (debugEnabled && (!contextDebugON || (debugMask &
Context.getMask( ) == debugMask))) {
  // Emit debug code
}
```

Debug Log File Message Format can includes the following fields:
  Timestamp
  Severity (in this case Debug)
  Debug attribute name (DebugMBeanHome in the example below)
  Machine name
  Server name
  Thread name
  User ID
  Transaction ID
  Msg id ('000000' for messages not I18ned)
  Message text
  Stack trace (optional)
  Context Id (optional)

< Jul. 29, 2003 1:41:23 PM EDT> <Debug> <DebugMBeanHome> <dwarkamai> <myserver> <main> <<WLS Kernel>> < > <000000> <Registering configMbean:mydomain:Location=myserver, Name=uddi, Type=ApplicationConfig for admin changes with adminMbean: mydomain:Name=uddi,Type=Application>

Non Limiting Example of Watches and Notification

The Watches & Notifications (W&N) system can serve as a primary component of the Diagnostic Framework that enhances the existing JMX monitoring and notification capabilities. The W&N system can be capable of allowing system administrators to express rules that specify relationships among multiple attributes of stored data, such as from multiple MBeans, and the ability to fire notifications once the specified rules are triggered. Apart from introducing an enhanced monitoring facility, the Diplomatic Framework can also introduces an enhanced notification system that allows notifications to be fired through disparate transportation mediums, such as SNMP traps, JMS, JMX, and SMTP. The W&N system introduces a notification architecture that allows the server software to add new transportation mediums easily. System administrators can have the ability to express parameterized rules for watches, as well as configure various notification transportation mediums, via an intuitive graphical interface that can be part of the administrative console.

The JMX 1.0 specification that provides a primitive monitoring mechanism and notification transport system. The JMX specification essentially defines three monitors, namely the StringMonitor, CounterMonitor, and GaugeMonitor. While these monitors are useful for monitoring a single JMX MBean, they quickly become insufficient for cases where a richer set of dependencies and relationships exist among MBean attributes that determine if a notification should be fired or not. Using a parameterized rule-based feature to express how attributes of an arbitrary number of MBeans should be monitored allows one to easily express monitoring criteria in a concise form. The JMX Notification mechanism that WLS currently implements only supports sending JMX notifications to other JMX agents and clients through a standard javax.management.Notification instance. An enhanced notification system can support other transport mechanisms apart from JMX, such as SMTP, SNMP, JMS, and user-specific mediums such as loggers, etc. Once the monitoring and notification transport facilities have been enhanced, system administrators can possess the capabilities to more intelligently monitor server software instances and managed resources deployed on them.

A parameterized rule-based feature becomes a very significant component of an intelligent monitoring system. The JMX specification describes a query language that can be used for selecting and filtering MBeans registered with the MBean Server. This query language is a JMX standard and provides support for various relational, string, numerical, and boolean expressions. However, the manner in which queries are constructed is a bit cumbersome to utilize, and does not provide a user-friendly expression language that system administrators can quickly harness to create complex watches that follow certain rules. Furthermore, the JMX MBean Server query language does not inherently support the construction of rules for dealing with watch/monitoring of various MBean attributes, but rather a mechanism for only querying the underlying MBean Server for MBeans that match certain criteria specified in the queries. Therefore, a parameterized rule-based feature can be implemented, which could provide a user-friendly interface that system administrators can utilize to construct watch/monitoring rules that enhanced monitoring entities could examine and execute. The rules can utilize the query expression language used in the Accessor component of the diagnostic framework.

In addition, a watch can have the concept of an alarm. If a watch evaluates to true and is configured as an alarm, then the watch need not be evaluated again till the alarm is reset. An alarm can either reset automatically when the specified amount of time has expired or manually by an administrator. Alarms are in-memory and can be reset upon server reboot.

JMX Notifications allow notifications to be transmitted across local and remote JVMs that house an MBean Server running within a server software instance. For applications which adhere to the JMX specification, this type of notification transport is very feasible and sufficient. However, there are many situations in which it would be advantageous to transport notifications across other mediums, such as SNMP, SMTP, and JMS. In a distributed environment in which multiple server software instances are present, it's more appropriate to transport notifications across the wire through an existing protocol that the underlying receiver/sender can more easily harness. The server software can provide custom notification listeners that can propagate notifications via disparate mediums such as SMTP, SNMP, and JMS.

The Watch can capture a system administrator's specific watch configuration. The system administrator can specify the rule expression for the watch by graphically selecting the attributes and relational expressions that should be applied before a notification is triggered. System administrators can create multiple "watches" for various attributes and events (log events, for example) in the system. A Watch artifact encapsulates a Watch rule expression, provides a mechanism to add/remove notification listeners for a particular watch, and can be enabled or disabled.

The Watch rule expression can uses the same syntax as the Accessor component, but have different variables for different types of rule expressions. The expression allows you to specify attributes, operators, and values. In one embodiment, there are three types of rule expressions: rules that refer to harvester data attributes, rules that refer to log events, and rules that refer to instrumentation events. A customer can specify the type of rule expression when creating the watch, and the watch rule can only refer to variables for that type of rule expression. Therefore, a rule can not refer to both harvester data attributes and log event data.

A primary abstraction in the W&N framework is the WatchManager, which actually manages the Watch artifacts and underlying details of evaluating rules using the various log events and Harvester. The WatchManager performs the evaluation of watches, manages the alarms for watches, and enables/disables specific Watches.

A Watch can encapsulate all of the information for a watch rule. This includes the watch rule expression, the alarm settings for the watch, and the various notification handlers that can be fired once a Watch rule expression evaluates to true.

Note that if an MBean suddenly unregisters from the MBean server, but is still referenced within a Watch, the particular Watch can be essentially deactivated. Additionally, notifications fired on behalf of a particular Watch are not guaranteed to arrive at their final destinations in the case of a server or subsystem failure.

In one embodiment, a concrete Watch rule expression implementation encapsulates all information that is necessary for specifying a particular rule and may include any of the following:

1. Variable name. This differs based upon the type of rule expression.
2. Specified threshold value (String, Integer, Long, Double, Boolean constant)
3. Operator (<, >, <=, >=, =, !=, AND, OR, NOT, MATCHES, LIKE)

The syntax for a watch rule expression can be the shared with the Accessor component. The proposed syntax is specified in the weblogic/diagnostics/query/Query.g and weblogic/diagnostics/query/TreeParser.g files. Each type of rule expression supports different variables. Variable names for the different types are listed below.

A log event rule expression refers to attributes of a log message from the server log. There are rule expression variables for the attributes of the weblogic.logging.LogEntry class. The variable names can be:

| Variable | Description | Data Type |
|---|---|---|
| Id | Id of Log Message. Usually starts with 'BEA-' | String |
| MachineName | Name of machine that generated the log message. | String |
| ServerName | Name of server that generated the log message. | String |
| ThreadName | Name of thread that generated the log message. | String |
| UserId | Id of User that generated the log message. | String |
| TransactionId | JTA Transaction id of thread that generated the log message. | String |
| Severity | I18N severity text of log message. See weblogic.logging.SeverityI18N for values. | String |
| Subsystem | Name of subsystem emitting the log message. | String |
| Timestamp | Timestamp when the log message was created. | Long |
| LogMessage | Message content of the log message. | String |
| Throwable | Exception associated with this log event. This is created by calling the toString method of the Exception. | String |

Example Log Event Rule Expression ((Severity='Warning') AND (Id='BEA-320012')

A harvester rule expression refers to attributes that are being harvested. The customer must specify the complete MBean object name as follows:
${DomainName:Name=MBeanName,
   Location=ServerName, Type=MBean Type, Parent=ParentName,Attribute=AttributeName}

Example Harvester Rule Expression ${mydomain:Name=HarvesterRuntime,
   Location=myserver, Type=HarvesterRuntime,
   ServerRuntime=myserver,
   Attribute=TotalSamplingCycles}>10

Instrumentation Event Data Variable Names:

An instrumentation event data rule expression can refer to attributes of a data record from the instrumentation event. There are rule expression variables for the attributes of the data record. The variable names are:

| Variable | Description | Data Type |
|---|---|---|
| Timestamp | Timestamp when the instrumentation event was created. | Long |
| ContextId | Diagnostic Context Id of instrumentation event. | String |
| TransactionId | JTA Transaction id of thread that created the instrumentation event. | String |
| UserId | Id of User that created the instrumentation event. | String |
| ActionType | Type of instrumentation action. | String |
| DomainName | Name of domain | String |
| ServerName | Name of server that created the instrumentation event. | String |
| ScopeName | Name of instrumentation scope | String |
| MonitorType | Type of monitor | String |
| SourceFile | Source file name | String |
| LineNumber | Line number in source file | Integer |
| ClassName | Class name of join point | String |
| MethodName | Method name of join point. | String |
| MethodDescriptor | Method arguments of join point | String |
| ReturnValue | Return value of join point. | String |
| Payload | Payload of instrumentation event data. | String |

Example Instrumentation Event Data Rule Expression (Action Type='ThreadDumpAction')

The WatchManager can be a singleton object whose primary purpose is to manage the W&N system. The WatchManager performs the following tasks:
1. Maintains a list of all watches. Maintains the state of a watch (enabled, disabled, alarm).
2. Is called by the Harvester after sampling is complete. Evaluates watches that refer to harvester attributes and calls back into the harvester to access harvested data from the current sample.
4. Is called by the Watch Log handler to evaluate watches that refer to log event attributes. Log events are queued are evaluated asynchronously.
5. Maintains alarms and resets alarms either automatically or manually.

The WatchManager is not a public class and does not need to be documented. The public interfaces are the configuration descriptors and the runtime MBean.

The Watch and Notification runtime MBean can contain methods to return statistics about the watch and notification processing performed by the Watch Manager. The MBean can contain methods to return the following information:
1. For each type of watch (harvester, log, instrumentation event), returns statistics about number of evaluation cycles, total number of watches evaluated, total evaluations to true, and average time per evaluation cycle.
2. Current active alarm count and maximum active alarm count.
3. Number of manual reset alarms and automatic reset alarms that have occurred.
4. Current active alarms.

The MBean also contains a method to reset an active alarm.

The administrative console utility can be the primary interaction point with the W&N system. The configuration and creation of the Watch and Watch rule expressions can occur when the system administrator graphically specifies watches and rules for MBean attributes via the administrative console. Watch rule expressions can also be modified at the command line via the weblogic.Admin utility or via the WebLogic Scripting Tool.

An enhanced notification system can support disparate notification transportation mediums to be added to diagnostic framework watches dynamically. Currently, the JMX notification mechanism only supports JMX as the primary transportation route for notifications. The enhanced notification system of the diagnostic framework can provides a mechanism for other mediums such as SNMP, SMTP, and JMS to be utilized when notifications are triggered. The Watches feature described in the previous section can utilize the enhanced notification system to dynamically emit notifications when Watch rules are satisfied.

Watch Notifications can be passed to notification listeners and contain details about a Watch that triggered, such as the watch name or watch type A notification can provide the following information:

1. Watch name (the name of the watch that evaluated to true).
2. Watch rule type (either harvested or log event rule)
3. Watch rule (the expression that evaluated to true).
4. Time watch evaluated to true (formatted, locale specific)
5. Watch severity level (utilizes same levels as WLS log events)
6. Watch alarm type (either AutomaticReset or ManualReset)
7. Watch alarm reset period (for AutomaticReset alarm types)
8. Watch domain name.
9. Watch server name.

Watch notifications can also contain payload information about the event that triggered the watch. This payload information can be specific to the type of watch rule. For a log event rule, it can be the attributes of the LogEntry. For an instrumentation data event rule, it can be the data record items. For a harvester rule, it can be the harvester data attributes referenced by the rule. The payload information can be contained in a set of key/value pairs. A log watch can provide the following information:
1. Id of Log Message.
2. Name of machine that generated the log message.
3. Name of server that generated the log message.

12. Class name of join point
13. Method name of join point.
14. Method arguments of join point
15. Return value of join point.
16. Payload of instrumentation event data.

A harvester watch notification can provide the following information:
1. For each attribute referenced in the rule expression, the type of the MBean, the name of the attribute and the value Notification listeners are responsible for providing the appropriate implementation of the particular transportation medium. For example, SMTP notification listeners can provide the actual mechanism to establish an SMTP connection with a mail server and trigger an e-mail with the Notification instance that it receives. JMX, SNMP, JMS and other types of listeners can provide their respective implementations as well. Essentially, any object that wishes to propagate events using a specific transportation medium can plug into the framework by implementing the JMX NotificationListener interface accordingly. The following table describes each notification listener type that WLDF provides out of the box, as well as the relevant configuration settings that correspond to each type of medium:

| NOTIFICATION MEDIUM | DESCRIPTION | REQUIRED CONFIGURATION PARAMETERS |
| --- | --- | --- |
| SMTP | Propagated via regular e-mail. | MailSession JNDI name, Destination email, subject (optional, defaulted if not present), body (optional, defaulted if not present) |
| SNMP | Propagated via SNMP traps and WLS SNMP Agent | No configuration is required in the watch, but the SNMPTrapDestination MBean must be defined in the WLS SNMP agent. |
| JMX | Propagated via standard JMX notifications | None required. Name of Notification is used for runtime MBean name. |
| JMS | Propagated via JMS Message queues or topics | Destination JNDI name. Connection factory JNDI name (optional, use default JMS connection factory if not present). |
| Diagnostic Image notification | Fired notification initiates the process of constructing a diagnostic image of the server | Location of Image Directory [DIAG-DIMG-FS] (optional, use default if not present). Lockout minutes (optional, use default if not present). |

4. Name of thread that generated the log message.
5. Id of User that generated the log message.
6. JTA Transaction id of thread that generated the log message.
7. I8N severity text of log message. See weblogic.logging.SeverityI18N for values.
8. Name of subsystem emitting the log message.
9. Timestamp when the log message was created.
10. Message content of the log message.
11. Exception associated with this log event. This is created by calling the toString method of the Exception.

An instrumentation event watch notification can provide the following information:
1. Timestamp when the instrumentation event was created.
2. Diagnostic Context Id of instrumentation event.
3. JTA Transaction id of thread that created the instrumentation event.
4. Id of User that created the instrumentation event.
5. Type of instrumentation action.
6. Name of domain
7. Name of server that created the instrumentation event.
8. Name of instrumentation scope
9. Type of monitor
10. Source file name
11. Line number in source file By default all notifications fired from Watch rules can be stored in the server log file in addition to being fired through the configured medium.

The following notification listener types can also be provided:
1. Pager
2. Node manager restart The customer can configure a MailSession MBean specifying the SMTP mail session properties and JNDI name. This can include the various mail properties of the JavaMail API Specification plus any SMTP mail properties. In the notification configuration, the customer can specify the JNDI name of the mail session plus attributes that can not be specified in the properties file. This can include the destination email address, the subject, and body of the mail message. If the subject is not configured, then it can default to the following format:

WLS Watch Notification: Watch '<watch name>' with severity '<severity>' on server '<server name>' has triggered at <date>

If the body is not configured, then it can default to the following format:
WatchName: Name
WatchRuleType: Type
WatchRule: Expression WatchTime: Time (locale specific format)
WatchSeverityLevel: Severity (Same as log event severities)
WatchAlarmType: Type (AutomaticReset or ManualReset)
WatchAlarmResetPeriod: TimePeriod
WatchDomainName: DomainName
WatchServerName: ServerName The body can also have key/value pairs for the event specific payload information. For example, a log event watch would have the following additional key value pairs in the body:
LogEntryThreadName: ExecuteThread: '13' for queue: 'weblogic.kernel.Default (self-tuning)'
LogEntryLogMessage: The elapsed time of the last snapshot of diagnostic metrics exceeded the configured sample period by the following number of milliseconds: 0.
LogEntryTimestamp: 1077834087283
LogEntryMachineName: Peter
LogEntryUserId: system
LogEntryTransactionId:
LogEntryId: BEA-320009
LogEntryServerName: adminServer
LogEntrySeverity: Warning
LogEntrySubsystem: Diagnostics
LogEntryThrowable: null
WatchDomainName: DiagnosticsTest
WatchServerName: adminServer A harvester watch would have the following additional key value pairs in the body:

HarvesterRuntime.TotalSamplingCycles: 10

The complete list of keys for the log and instrumentation event watch types can be found in the weblogic.diagnostics.watch.WatchNotification class.

In a server SNMP agent, the customer can configure a SNMPTrapDestionation MBean specifying the SMTP trap destination configuration. In the notification, no SNMP configuration need be required If a watch rule evaluates to true and a SNMP trap notification is configured, then the server SNMP agent can be used to send the trap to all of the configured SNMP trap destinations. A WebLogic specific trap can be sent with the specific trap type of 85. The variable binding name/value pairs for the trap can be as follows.
- trapWatchName—Name of the watch rule that evaluated to true.
- trapWatchRuleType—Type of watch (either log or harvestable type).
- trapWatchRuleExpression—the rule for the watch.
- trapWatchTime—The time at which the trap was generated (milliseconds).
- trapWatchSeverityLevel—The severity of the watch notification (utilizes same levels as WLS log events)
- trapWatchAlarmType—If the watch is configured to act as an alarm, then the type of alarm (either AutomaticReset or Manual).
- trapWatchAlarmResetPeriod—If AutomaticReset type, then the amount of time before the alarm is reset.
- trapServerName—The name of the server on which the trap was generated.
- trapWatchData—The set of key/value pairs for the watch specific payload. This can be in the form key=value, key=value. The keys are specific to the type of watch. The list of keys can be found in the weblogic.diagnostics.watch.WatchNotification class.

The customer can configure the JMS subsystem. This includes the connection factory and JMS destination (queue or topic, distributed or not). In the notification, the customer can specify the JNDI name of the destination and optionally the JNDI name of the connection factory.

If a watch rule evaluates to true and a JMS notification is configured, then the listener can create a JMS Key/Value message and send it to the JMS destination using the JNDI name of the destination. If the JNDI name of the connection factory is not specified, then the JMS default connection factory can be used. The key value pairs in the JMS message can be as follows:

| Key | Value |
| --- | --- |
| WatchName | Name |
| WatchRuleType | Type |
| WatchRuleExpression | Expression |
| WatchEvaluationTime | Time (formatted, locale specific) |
| WatchSeverity | Severity (Same as log event severities) |
| WatchAlarmType | Type (AutomaticReset or ManualReset) |
| WatchAlarmResetPeriod | TimePeriod |
| WatchDomainName | DomainName |
| WatchServerName | ServerName |

The JMS message can also contain watch specific payload information as individual key value pairs in the JMS message.

The customer can specify the notification name for the JMX notification. A runtime MBean can be created during the creation of the notification. The customer can be able to look up the MBean and attach a JMX listener to the MBean.

If a watch rule evaluates to true and a JMX notification is configured, then the listener can send the Watch Notification to the MBeans. The customer can have added a listener to the specified MBean, and in the listener can check for the WatchNotification instance, and utilize the information in the WatchNotification class to perform the desired action.

In the notification configuration, the customer can optionally specify the diagnostic image directory and lockout minutes.

If a watch rule evaluates to true and an image notification is configured, then the listener can call the ImageManager to create the diagnostic image.

Non-Limiting Example of Archive

The Archive component can manage the persistence of collected data and published events. Additionally, the Archive provide access to data stored in various log files. The data thus collected cam be persisted on disk so that it is available for observing trends and root cause analysis. The data can be collected and persisted in an efficient manner, without damaging performance significantly. The cost of collecting and persisting data must be within reasonable limits. The persisted data can be available for rendering and analysis by tools both when the server is running and is shutdown. Also, certain configuration aspects of the archive can be tuned by the user and must be exposed to the user in a standard manner.

An Archive can logically consist of three components and be instantiated on a per-server basis: data archive, event archive, and log archive. The Archive can internally manage the persistence of data collected from various sources as well as published event data that the Archive consumes. The collected data can be pushed into the Archive by the Harvester and other data provider components at regular intervals defined by the sampling period. On the other hand, event data can be spontaneously generated on the occurrence of some particular event. These events are different from logging events which go to the server log file. For example, data coming from a trace event would be published to the Archive and thus persisted. The Archive can expose two sets of interfaces, one for reading and one for writing. The writing interfaces are exposed to the data providers and data publishers. The reading interface can be invoked by the Accessor and other data retrieval components to present the persisted data to external clients based on their request. The persisted data can be available even when the server is not running, hence the Archive component may be able to be instantiated in a non-server process. In one embodiment, when running in a non-server process, only the reader interfaces can be honored. The Archive can be defined by its Reader and Writer interfaces, thus the actual persistence mechanism can be transparent to all other components that interface with the Archive.

The Writer interfaces can be exposed to data providers and data publishers. These interfaces can define how the data to be persisted is presented to the Archive. The Reader interfaces can be exposed to data retrieval components to access the persisted data of the Archive. The configuration artifact can be responsible for the initialization and configuration of the Archive for offline as well as online access modes.

The Writer interfaces can be exposed to data providers and data publishers so that they may instruct either the sampled or event data to be persisted. The Writer interfaces can consist of the DataWriter and EventWriter interfaces for persisting sampled data and events, respectively. The Writer interfaces need not be functional when the Archive is running in offline mode.

The DataWriter interface, which can be implemented by the Archive component, can be invoked by the Harvester component of the diagnostic framework or other data provider components. It defines a single method to persist the sampled data collected over the last scan of all currently harvested values. The data sample itself is represented by the DataSample interface.

The EventWriter interface, which can be implemented by the Archive component, is invoked by the event source to persist the generated event. It can define a single method to persist the event data represented by the EventData interface.

Reader interfaces can be implemented by the Archive component for read-only access to the archived data. The DataReader interface can define the contract between the Archive and data retrieval components (e.g. the Accessor). Similarly, the EventReader and LogReader interfaces can allow the event and log data to be read in an implementation neutral manner.

The data reader can allow the Accessor and other data consumption components to obtain the metadata about the information stored in the Archive, as well as to fetch the data requested based on input parameters. The event reader allows the event data to be retrieved from the Archive. The log reader can allow various log events to be retrieved from the Archive.

An Archive configuration artifact can be the central means of configuring and initializing the Archive. The Archive may be manifested in various forms, such as a flat file or XML database, with each form having its own specific set of configuration and initialization parameters. The default native format of the Archive can be a file based implementation, however certain tools can be supported to convert from the native format to other formats (XML, etc). Configuration parameters for the file based implementation of the Archive are listed here, however configuration parameters for other internal implementations of the Archive are out of the scope of this document.

The archive configuration can be provided by the ArchiveManager artifact that can capture the locations and size limitations for the persisted data.

The Archive component can be capable of providing read-only access to the stored data when present in offline access mode. In online access mode, both the reader and writer access can be granted. In offline mode, the Archive can utilize MBean stubs for its configuration purposes.

Non-Limiting Example of Harvester

The Harvester can be a central component of the WebLogic Diagnostic Framework that is primarily responsible for harvesting and collecting data exposed via customer MBeans as well as other harvestable data sources. The Harvester can be capable of balancing dynamism and performance to harvest diagnostic data in an efficient and accurate manner while supporting various types of harvestable entities. In the following sections, the important features and functionality of the Harvester are discussed: definition of harvestable entities, registration and unregistration of harvestable entities, and the control interfaces that the Harvester exposes for the activation and deactivation of harvested data.

The most common way of exposing runtime diagnostic data for managed resources in J2EE is to query layered JMX MBeans that express meaningful state for various components of resources. However, other sources of diagnostic data may also wish to engage in the collection process. Most harvestable entities expose a significant amount of attributes for resources, and may not always be important or meaningful for the end user who wishes to collect specific data for various managed resources. The Harvester addresses this issue by incorporating a dynamic harvest configuration feature that interacts with the Manager to determine which subset of harvestable attributes should be harvested at any given moment in a running WLS instance. The dynamic harvest configuration component essentially enables the Manager to activate and deactivate the collection of specific harvestable diagnostic attribute values.

Once data is collected, it must be persisted for further root cause analysis tools to take control and perform analyses of the system state that was captured. Therefore, the Harvester must not only interact with the Manager, but also the Archive component of the diagnostic framework. The interfaces that the Harvester exposes to the Manager, Archive, and other subsystems must be well defined and extensible so that it can be expanded to possibly tap into other sources of diagnostic resources apart from JMX MBeans. Another significant issue regarding the Harvester involves the balance between dynamism and performance. One can imagine a scenario in which multiple subsystems are concurrently accessing the Harvester and instructing it to harvest only certain types of attributes for specific harvestable entities. The Harvester must be able to dynamically reconfigure itself based on requests from the Manager, but at the same time be able to actually harvest the data and transport it to the Archive. Therefore, a mechanism must be introduced to ensure dynamic behavior while still maintaining a system that performs as customer requirements dictate.

In one embodiment, there are two ways in which an entity can mark itself as a harvestable resource for data consumption via the Harvester. Both mechanisms can provide access to the following information: harvestable attributes, values of harvestable attributes, metadata for harvestable attributes, and finally a name for the harvestable entity. The two mechanisms are differentiated based on the types of harvestable entities.

The first manner involves implementing a customer MBean and registering it as a harvestable entity with the Harvester. The second approach allows non-JMX resources to implement the HarvestableDataSource interface to participate in the data collection feature of the Harvester. The Harvester can thus be capable of appropriately introspecting the harvestable resources to engage in the collection process.

The following table expresses the symmetry between the two approaches for defining a harvestable entity. Note that the primary difference between the two approaches is that the MBean approach leverages functionality of JMX that can be utilized to fulfill the harvestable criteria. However, the HarvestableDataSource approach enforces the implementer to express these characteristics in a more direct fashion.

| Harvestable Criterion | Harvestable Customer MBeans | HarvestableDataSource |
| --- | --- | --- |
| List of harvestable attributes | All attributes defined on MBean are assumed to be harvestable | getHarvestableAttributeNames |
| Harvestable attribute metadata | MBeanInfo MBeanAttributeInfo | getHarvestableAttributeMetadata |
| Harvestable attribute values | Exposed via standard getter methods on the MBean | getHarvestableAttributeValue |
| Registration/Unregistration | addHarvestableMBean removeHarvestableMBean | addHarvestableDataSource removeHarvestableDataSource |
| Unique identifier for entity | MBean ObjectName | getName |

Once an entity has marked itself as harvestable by implementing the appropriate interface, it can register itself with the Harvester. There are two registration/unregistration approaches that are dependent upon the specific definition of the harvestable entity. If a customer MBean is to have its attribute values harvested, it invokes the MBean registration API of the Harvester. However, if the harvestable entity has implemented the HarvestableDataSource interface, it must explicitly register and unregister itself with the Harvester via the specific methods defined on the HarvesterRegistrationHandler interface.

The HarvesterManager serves as the primary means of configuring the Harvester dynamically. The HarvesterManager can support the persistence of Harvester configuration settings across server restarts. As well, system administrators are able to dynamically disable or enable the Harvester while retaining the settings of which harvestable resources and attributes are being harvested.

An entity can possess the following primary characteristics in order to be categorized as harvestable:
1. List of harvestable attributes
2. Harvestable attribute metadata
3. Harvestable attribute values
4. Registration/Unregistration
5. Unique identifier for entity Customer MBeans that wish to engage in the collection process of the Harvester c can register as such via the HarvesterRegistrationHandler. For MBeans, the Harvester assumes that all attributes are harvestable, metadata is provided via the MBeanInfo/MBeanAttributeInfo objects, the name is the MBean ObjectName, the attribute values are exposed via standard getter methods, and the registration/unregistration facilities are provided via the HarvesterRegistrationHandler interface.

Non-MBean harvestable entities can implement the HarvestableDataSource interface to engage in the collection process of the Harvester. For those entities that implement HarvestableDataSource, the Harvester can invoke methods for retrieving the harvestable attribute names, retrieving harvestable attribute values, retrieving harvestable attribute metadata, and retrieving the name of the harvestable data source. The registration/unregistration facilities can be provided via the HarvesterRegistrationHandler interface.

The Harvester can collect data based on primitive values only, not on complex types. The Harvester collects the following primitives:
1. Integer
2. Long
3. Double
4. Boolean
5. String
6. Character
7. Byte Harvestable entities can be uniquely identified by combining the following characteristics:
1. Unique name
2. Unique type
3. Server
4. Domain The above characteristics are encapsulated in implementations of the DiagnosticObjectName interface.

Customer MBeans that wish to participate in the collection process of the Harvester can explicitly register as such via a well-defined registration interface. Harvestable customer MBeans are encouraged to explicitly unregister with the Harvester, however the Harvester can detect MBeans that no longer exist and remove them from the list of MBeans for data collection.

The Harvester can also consume harvestable data from non-JMX resources. For example, diagnostic metric data published from other components in the diagnostic framework as well as other potential sources of information (such as SNMP) can also be harvested via a pluggable mechanism. Essentially, the non-JMX harvestable data source can provide an implementation of the HarvestableDataSource interface so that the Harvester can extract the necessary information to perform collection on behalf of the harvestable data source. Since the HarvestableDataSource lives outside of JMX, there can be an explicit manner in which the data source can register and unregister itself with the Harvester.

Steps for a developer to register an MBean and mark it as a harvesting candidate can be:
1. Developer writes an MBean.
2. Developer registers MBean with the MBean Server.
4. Developer registers MBean with the Harvester via addHarvestableMBean( ).

5. Harvester is notified of the newly registered MBean and records it internally.

Steps for Registering Other Harvestable Data Sources for the Harvester

1. Developer writes an object.
2. Developer implements the HarvestableDataSource interface.
3. Developer registers the harvestable entity with the Harvester via addHarvestableDataSource( ).
4. Harvester is notified of the newly registered entity and records it internally.

Note that for both registration approaches, the Harvester can schedule any newly registered harvestable entities for the next sampling pass if the entities are registered while the Harvester is currently collecting metrics for existing harvestable entities.

The ObjectName format generated for ServletRuntime MBeans follows a dynamic naming convention that appends a number at the end of the servlet's name. This number corresponds to the actual instance of the servlet in memory, as a single servlet type may be instantiated a number of times in a WLS instance. The Harvester can be aware of the dynamic nature of each servlet's name in order to aggregate the metrics of each instantiated ServletRuntime MBean per servlet name. For example, a custom servlet entitled MyServlet may be instantiated ten times in a server instance, which results in ten unique ServletRuntime MBean instances. As these instances are registered in the MBean Server, the Harvester must be able to recognize that each instance is related via the name "MyServlet" and begin harvesting metrics for the servlet instances immediately (assuming that a client has instructed the Harvester to collect metrics for a particular servlet). Note that the console can display all instances of ServletRuntime for a particular servlet as "rolled up" into a single item such as "MyServlet", instead of listing all of the instances with dynamically generated numbers as a harvesting selection point. The following listings and table describe the actions that the Harvester takes for harvesting a regular MBean as well as the special ServletRuntime case:

Instantiated JDBCConnectionPoolRuntime MBean

1. Harvester receives notification of instantiated instance.
2. If the MBean type has been previously recorded for harvesting, then record this instance for harvesting.
3. If the MBean type has not been previously recorded for harvesting, then record this instance and type as harvestable.

Instantiated ServletRuntime MBean

1. Harvester receives notification of instantiated instance.
2. If the MBean type has been previously recorded for harvesting, strip off the generated number at the end of the servlet's name and determine if that particular servlet has been recorded for harvesting.
3. If the specific servlet has been scheduled for harvesting, then record the newly instantiated ServletRuntime MBean for harvesting.
4. If the MBean type has not been previously recorded for harvesting, then record this instance and type as harvestable.

Regular/Irregular MBean Harvesting Characteristics Table

| Characteristic | JDBCConnectionPoolRuntime | ServletRuntime |
| --- | --- | --- |
| Harvestable type | JDBCConnectionPoolRuntimeMBean | ServletRuntimeMBean |
| Harvestable instance name | ObjectName | ObjectName |
| Selection of attribute to be harvested for type | JDBCConnectionPoolRuntime: activeConnectionsCurrentCount | ServletRuntime: invocationTotalCount |
| Selection of instance to be harvested for type | Original ObjectName | Original ObjectName with trailing number stripped |

The Harvester exposes its configuration interface via a central HarvesterManager. The HarvesterManager can initially allow operations to be performed on harvestable types as opposed to instances. System administrators and other users can invoke this management interface to do the following:

1. Retrieve all harvestable types.
2. Set the Harvester's configured sampling period (same for all harvestable types).
3. Configure the Harvester to collect data for specific attributes.
4. Configure the Harvester to not collect data for specific attributes.
5. Retrieve all currently harvested attribute names for a particular harvestable type.
6. Retrieve all currently harvested attribute values for a particular harvestable instance.
7. Completely enable or disable the Harvester while retaining user's settings.

Harvestable entities can be represented as a specific type (e.g.: JDBCConnectionPoolRuntimeMBean) and instances of that particular type. The Harvester allows configuration at the following levels:

1. Configuration of attributes to be harvested at the "type" level only. All selected attributes to be harvested can be applied to all instances of the type.
2. Configuration of which specific instances of a particular type can be candidates for harvesting.

Note that the HarvesterManager API can supports adding/removing attributes at the type level only. For example, if for a particular MBean type there are five instances configured for harvesting, then adding or removing harvested attributes affects all of the instances of the specified MBean type. If no instances of an MBean are specified, but rather only an MBean type, then the Harvester configures the attributes to be harvested for the type and applies it to any future MBean instances of that type that register with the Harvester.

Once the user has set the sample period for the Harvester via the HarvesterManager, the following actions occur:

1. Harvester polls/samples the harvestable entities (at unified sample period) and collects the latest values for currently harvested attributes.
2. Read-through MBeans (those that only update their values when the respective getAttributeName( ) method is called) are handled properly.

3. The time at which harvested attributes are collected from the harvestable entities are bundled with the sample as a "time stamp."

5. The Harvester pushes the collected diagnostic data (those attributes to be persisted) to the Archive.

Note that the Harvester can operate in two modes: it can harvest attributes and not persist them to the Archive, and it can also harvest attributes and persist them to the Archive. Once the data has been harvested and is ready to be propagated to the Archive, the Harvester can attempt to provide various statistics that the developer or system administrator may find useful when observing the collected diagnostic data, such as:

1. How long it takes to retrieve the names of all of the harvestable attributes for a harvestable entity.
2. How long the getAttributeName( ) (where "AttributeName" is a valid name of an attribute) takes to return with a value.
3. Scan/Sample time (how long it takes the Harvester to find and invoke an attribute value method).
4. Number of attributes harvested.

Other relevant statistics may be collected as well and incorporated into the harvested diagnostic data. Additionally, an error entry can be placed in the log file if the time it takes to sample a harvestable attribute exceeds the sample period.

The Harvester can maintain various internal house-keeping data structures to record which harvestable entities and attributes are currently being harvested. System administrators invoking the HarvesterManager directly affect the behavior of the Harvester, as outlined in the previous section. The HarvesterManager can also provide persistence capabilities so that subsequent server restarts can retain the user's harvesting settings. Furthermore, in order to support the enabling and disabling of the Harvester at runtime, the user's settings must also be recorded within the Harvester and persisted if the user wishes to retain those settings for a future server instance.

The HarvestableDataSource implementations can be automatically generated for server runtime entities that expose diagnostic metrics. The runtime artifacts can be marked/tagged with javadoc tags that can be subsequently processed to generate the HarvestableDataSource implementations. The code generation tool can extract annotations to provide: list of harvestable attribute names, harvestable attribute values, harvestable attribute metadata, as well as the name of the harvestable data source. Note that there can also potentially be an internal static harvestable list for server runtime entities in order to avoid any overhead of explicitly registering them with the Harvester upon server startup.

Logging Framework

The Logging framework can perform efficiently with a low overhead and we need to identify possibilities where we can make Logging faster and scalable for increased throughput. The log content should also include additional context information to support easy analysis by allowing filtering of messages emitted within the scope of a particular application request. The J2EE Servlet APIs provide an interface for Web Applications to log application related events using the ServletContext. These messages can go to the webapp specific log as opposed to the server log where it gets directed today. Similar logging facility can be provided to a J2EE Resource Adaptor for ManagedConnectionFactory and ManagedConnection scoped logging.

Enhancements to the LogMBean interfaces allow users to control the logging output by means of levels and filters.

Non-Limiting Example of Diagnostic Manager

The Diagnostic Manager can allow for the configuration and control of components in the diagnostic framework. It can define the diagnostic framework configuration API for Administrative clients such as the WebLogic Administration Console, command line tools, scripting utilities or other third-party tools to configure and control the behavior of the Diagnostic Framework components. The Manager can also defines the runtime interfaces that describe the state of the Diagnostic Framework.

The Diagnostic Manager can be a logical component that is made up of two sets of interfaces, a Configuration interface for configuring the runtime behavior and a Runtime interface for accessing the runtime state of the diagnostic framework. The Configuration interfaces can be used to configure and control the different components of the Diagnostic Framework. The configuration can take place on the Admin server and the changes can be pushed to the Managed Server, where the updates can be applied. The Runtime interfaces can reflect the current state and also expose operations on the different components of the Diagnostic Framework. Both the Configuration and the Runtime interfaces can be exposed as MBeans.

It is assumed that OA&M Configuration can provide a standard mechanism of configuration persistence and distribution to the managed servers in the server domain. The Diagnostic Framework can make use of the OA&M infrastructure for this purpose. The Diagnostic Manager need not provide any mechanism to view or retrieve the data collected by the Harvester component. This can be provided by the Accessor component of the Diagnostic Framework.

The diagnostic configuration can define Configuration Beans that can be used to configure the WLDF.

The Runtime interfaces of the Manager can expose the runtime state and operations defined for the different components of the diagnostic framework.

The diagnostic framework configuration can have two aspects, elements that are defined and configured at the Server level and elements that are at defined at the domain level and deployed to a Server. The ServerDiagnosticMBean can contain the configuration elements of the diagnostic framework applicable to each WebLogic Server instance. The ServerDiagnosticMBean can be a child of the ServerMBean. The DiagnosticDeploymentMBean can be defined at the domain level and targeted to individual servers. This can enable multiple servers to share the configuration aspects that are defined at the domain level. A managed server is however associated with at most one instance of the DiagnosticDeploymentMBean.

The ServerDiagnosticMBean can be a child of the ServerMBean and can define configuration aspects of the diagnostic framework that are defined at the Server scope. This includes the directory location for the image sources generated by the diagnostic framework.

The DiagnosticDeploymentMBean can define the configuration aspects of the diagnostic framework that can be defined at the domain level and targeted to individual servers. It can contain the configuration elements for the Instrumentation, Harvester and WatchNotification components of the diagnostic framework.

The Instrumentation MBean can interact with the Instrumentation Framework and enable selected monitors with configured advices at the defined point cuts. The Instrumentation MBean can enable the following use case scenarios through the APIs that it exposes.

Instrumentation Configuration Primitives of One Embodiment:

- The user enables or disables the entire instrumentation behavior in the given scope, which could be either application or sever.
- The user specifies what classes needs to be included in the instrumentation in a given scope.
- The user excludes certain classes from getting instrumented by the different monitors in this scope.
- The user adds/removes a monitor of a specified class to the instrumentation scope. They also select the point cuts for the monitors which could be fixed for standard and delegating monitors.
- The user specifies the configuration properties of a given monitor.
- The user enables or disables a specific monitor.
- The user adds/removes an advice from a given monitor.
- The user specifies the configuration properties of an advice.

The Harvester MBean can define how the diagnostic data is collected by the Harvester component of the diagnostic framework. The Harvester MBean can support the following configuration primitive operations that can be part of the harvester configuration scenarios. Harvester configuration primitives of one embodiment:

- The user enables or disables the Harvester component, so that data collection and persistence is either enabled or disabled for the harvested attributes.
- The user sets a new value for the global sampling rate for the harvester.
- The user queries the manager to show all the known harvestable types known to it.
- The user queries the manager for all the known harvestable attributes for a given type.
- The user selects a harvestable type and specifies the list of attributes that should be enabled for collection for the given type.
- The user queries the manager for all the currently harvested types.
- The user queries the manager to show the currently harvested attributes for a harvestable type.
- The user adds/removes attributes from the set of currently harvested attributes for a specific type.
- The user queries the manager for all the known harvestable instances for a given type.
- The user specifies the set of instances to be harvested for the specified type.
- The user adds/removes an instance from the harvested set for the specified type.

The Watch Notification MBean can define how watches are selected, rules defined and notifications issued to the specified destinations document.

Watch and Notification Configuration Primitives of One Embodiment:

- The user enables or disables all the configured watches globally.
- The user creates a new Watch and selects the instances to be watched, along with their attributes. Only instances that are currently being harvested can be added to the Watch.
- The user constructs the rule for the watch based on the attributes of the selected instances.
- The user deletes a specific Watch. Note that this can also delete the associated rule definition.
- The user adds different types of notifications that can be emitted when a watch rule is triggered. Note that the event causing the watch rule trigger is always persisted in the event log.
- The user removes all or some of the notifications emitted when a watch rule is triggered. When no notification is enabled, the event can be persisted in the event log.
- The user creates a watch to observe log events specifying the filtering rules for the log watch.

The runtime interfaces define the runtime state of the different diagnostic framework components. They also expose the operation defined for each component. The instances of these interfaces can live on the individual managed servers. These interfaces are defined as Runtime MBeans so that a JMX client can easily access them. The DiagnosticRuntime interface can encapsulate all other runtime interfaces for the individual diagnostic framework components.

Non-Limiting Example of Accessor Component

The Weblogic Diagnostic Framework can capture a variety of diagnostic data from various sources. The Accessor component can provide access to this data to the internal and external clients such as console, third party tools etc.

The Diagnostic Framework can capture and maintains a variety of diagnostic data from various sources in a running server. Such information includes data in runtime MBeans, non-jmx data sources, various log files, trace and event files, etc. Thus, diagnostic framework acts as a central repository of diagnostic information. This information can be used by human operators as well as tools to identify problems in a production environment. In order for this information to be useful, it needs to be made accessible to suitable clients. The accessor component of diagnostic framework provides a single access point to clients. Such clients can be internal tools such as Console, or they can also be external third party tools. The accessor can provide functionality to supply data to clients on demand.

The diagnostic framework maintains diagnostic information per server. Consequently, the accessor component of diagnostic framework on a server provides access to diagnostic information for that server. The diagnostic framework can maintain different kind of diagnostic information in separate data stores, which can be modeled as tabular data. Using the accessor APIs, clients can access diagnostic data in tabular form.

The accessor functionality, which can be available from a running server can be exposed as a runtime MBean.

Historical diagnostic data, such as archived metrics, log and event files, etc can be available even when the server is not running. The accessor component can enable offline tools to access such data by providing suitable functionality to offline tools. Such offline access can be possible only from the local server.

The accessor can provide a "synchronous pull" model for the clients to access diagnostic data from diagnostic framework. It need not cover sending data to interested clients asynchronously. This document also describes functionality which can be used to build offline tools to access historical diagnostic information when the server is not running.

The accessor can provide metadata on what data is available, such as log files, harvested metrics and historical data on a server. The accessor can allow clients to access data captured by the diagnostic framework, which includes harvested metrics, logs and events. Accessor component can make part of its functionality available to offline tools to access persisted diagnostic data such as log files and historical harvested data. Thus, persisted diagnostic data can be made accessible even when a server instance is not running. Offline access can be available only locally. Access to historical data in offline mode can rely on file system protection mechanisms.

The accessor can provide unified access to diagnostic data in disparate data stores. Although different data-stores may have different layouts in terms of the attributes (columns), they can be modeled as tabular data. The accessor can provide a query language to query data from the data stores.

Often, it is more efficient to stream large amount of data to remote clients, rather than require them to access data in piece-meal manner. This can be achieved by providing an access servlet to remote clients to access certain diagnostic data. Data can be streamed into the servlet's output stream, which can be read by the remote client. For example, with this mechanism, it can be possible to efficiently transmit raw data from sections of log files. Similarly, a large amount of collected diagnostic metric and event data can be streamed out as an XML document, which can be consumed by the remote client.

The diagnostic framework can collect diagnostic information from different sources. The consumers of this information should know what diagnostic information is collected and available. The accessor component can provide functionality to programmatically obtain such Meta information.

The accessor component can provide information regarding available diagnostic information from other diagnostic framework components. Information captured by diagnostic framework can be segregated into logical data stores, separated by the types of diagnostic data. For example, Server logs, HTTP logs, JDBC logs, harvested metrics etc, can be captured in separate data stores. The accessor component can provide functionality to discover such data stores and find out about the nature of data they contain.

Data stores can be logically viewed as a collection of tabular data. Each record in the table represents a datum. Columns in the table describe various characteristics of the datum. Different data stores may have different columns. However, most data stores can have some shared columns, such as the time when the data item was collected.

The Meta information made available can include:
List of supported data store types, e.g., SERVER_LOG, HTTP_LOG, HARVESTED_DATA etc
List of available data stores.
Layout of each data store, i.e., information about columns in the data store.
Exceptional situations, such as request for information on a non-existent data store can cause appropriate exception to be thrown at the caller, as described in the interface section below.

The accessor can make the Meta information available through following interfaces. DiagnosticCurrentAccessService interface contains methods to identify supported data-store types as well as names of available data-stores. It also provides a method to get a reference to a named data-store represented by an instance implementing DiagnosticDataAccessService interface. The DiagnosticDataAccessService provides a number of methods to get Meta information about the data store.

The accessor can provide functionality to access data captured in different data-stores. Although each data-store may have different layout, data can be accessed using the single unified API. Data is queried by specifying a query expression in string form. All records from the data-store which match the specified query can be returned. By specifying appropriate constraints in the query, a client can filter the data in different ways.

Although different data-stores may have different layouts, the accessor can provide a unified access mechanism for all data stores.

The accessor can provide functionality to selectively access data from different data stores. Data to be accessed can be selected based on specified query criterion. Based on the query, a client can limit the volume of data sent to it.

Exceptional situations can cause an InvalidQueryExpression exception thrown to the called. The conditions can include:
Syntax error in the query expression
Invalid column names in the query
Semantic errors in the query, such as semantically inconsistent operations with columns in the data store Persisted diagnostic data such as historical harvested data and log files provide a rich source of information for identifying problems. It can be accessible even when a server instance is not running. As described in previous sections, the accessor component can make this information available to offline tools through defined interfaces. The accessor component provides the underlying functionality to access data. The presentation of the data can to be handled by offline tools.

The accessor can provide functionality to selectively access diagnostic data by specifying a query criterion. The query can be specified as a string, in the query language defined by the accessor. The query language syntax can be a small and simplified subset of SQL syntax. Its purpose can be to specify the selection criteria to build Boolean expressions based on the column names supported by the data store. Using the query language, it can be possible to specify relatively complex selection expressions which typically appear in the WHERE clause of an SQL SELECT statement.

The query can be executed against a specific data store. Thus, the "FROM" part of the query can be implicit. Upon match, all columns of matching rows can be returned. Following example shows the query to capture harvested attributes of JDBC connection pool 'MyPool' within a interval between start_time (inclusive) and end_time (exclusive).

```
( (TIMESTAMP >= start_time AND TIMESTAMP < end_time)
AND
(TYPE = 'JDBCConnectionPoolRuntimeMBean' AND
INSTANCE_NAME = 'MyPool')
)
```

The variables in the criterion expression can be the column names of the data store. If a column is of Boolean type, it can be used directly in the expression. Otherwise, it can be used in a comparison operation consistent with its type.

Literals can participate in comparison operations. Literals can be numeric, or string types. Numeric literals can be integers or floating point numbers.

String literals are enclosed with double quotes. A percent ("%") character is used as a wild card inside string literals. A backslash ("\") character is used to escape special characters, (such as double quotes and percent characters) in string literals if needed.

The query language can allow binary comparison of data-store columns with literals. Thus, expressions of the type (variable OP literal) can be possible. Supported binary comparison operators can include:

| Operator | Operand Type | Example | Description |
| --- | --- | --- | --- |
| = | Numeric, String | VALUE = 100 | True if specified column value equals 100 |
| <> | Numeric, String | VALUE <> 100 | True if specified column value does not equal 100 |
| > | Numeric | VALUE > 100 | True if specified column value is greater than 100 |
| >= | Numeric | VALUE >= 100 | True if specified column value is greater or equals to 100 |
| < | Numeric | VALUE < 100 | True if specified column value is less than the 100 |
| <= | Numeric | VALUE <= 100 | True if specified column value is less or equals to 100 |
| like | String | TYPE like "% Runtime" | True if specified column value ends with 'Runtime' |
| like | String | TYPE like "Web %" | True if specified column value starts with 'Web' |
| like | String | TYPE like "% Component %" | True if specified column value contains 'Component' |

Complex query (sub) expressions can be built using subexpressions involving variables, binary comparisons and other complex subexpressions.

a AND b will evaluate to true, iff both subexpressions a and b evaluate to true.

a OR b will evaluate to true iff either subexpressions a or b evaluate to true.

NOT a will evaluate to true iff subexpression a evaluates to false.

(a) will evaluate to true iff subexpression a evaluates to true.

Operator precedence in complex expressions can be as follows (from highest to lowest):

( )
NOT
=, < >, >, >=, <, <=, like
AND
OR

One embodiment of the present invention may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROM's, EEPROM's, DRAM's, flash memory devices, magnetic or optical cards, Nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method comprising:
   instrumenting classes of server software with a diagnostic monitor, the diagnostic monitor including at least one diagnostic function; and
   enabling the diagnostic function at the diagnostic monitor while the server software is running without restarting the server software;
   wherein a function is added or removed from the diagnostic monitor by adding or removing an advice from a list of advices for the diagnostic monitor.

2. The method of claim 1, wherein the diagnostic function is a counter.

3. The method of claim 1, wherein the diagnostic function includes saving arguments.

4. The method of claim 1, wherein the diagnostic function are limited to a selected predetermined set of actions.

5. The method of claim 1, wherein the instrumenting includes weaving an indication of the diagnostic monitor.

6. The method of claim 1, wherein a library of diagnostic monitors is provided.

7. The method of claim 1, wherein a different diagnostic function can be selected for the diagnostic monitor while the server software is running without restarting the server software.

8. The method of claim 1, wherein each diagnostic monitor is associated with a pointcut.

9. A computer readable storage medium including code comprising:
　an instrumentation unit to instrument server software at a pointcut with a diagnostic monitor, and
　the diagnostic monitor having at least one diagnostic function, wherein diagnostic actions can be enabled for a pointcut at the diagnostic monitor while the server software is running without restarting the server software;
　wherein a function is added or removed from the diagnostic monitor by adding or removing an advice from a list of advices for the diagnostic monitor.

10. The computer readable storage medium of claim 9, wherein the diagnostic function is a counter.

11. The computer readable storage medium of claim 9, wherein the diagnostic function includes saving arguments.

12. The computer readable storage medium of claim 9, wherein the diagnostic function are limited to a selected predetermined set of actions.

13. The computer readable storage medium of claim 9, wherein the instrumenting includes weaving in the diagnostic monitor.

14. The computer readable storage medium of claim 9, wherein a library of diagnostic monitors is provided.

15. The computer readable storage medium of claim 9, wherein different diagnostic function can be selected for the diagnostic monitor while the server software is running without restarting the server software.

16. The computer readable storage medium of claim 9, wherein each diagnostic monitor is associated with a pointcut.

17. A method comprising:
　instrumenting classes of server software with a diagnostic monitor; and
　selecting and enabling a diagnostic function for the diagnostic monitor while the server software is running without restarting the server software;
　wherein a function is added or removed from the diagnostic monitor by adding or removing an advice from a list of advices for the diagnostic monitor.

18. The method of claim 17, wherein the diagnostic function is limited to a selected predetermined set of actions.

19. The method of claim 17, wherein the instrumenting includes weaving an indication of the diagnostic monitor.

20. The method of claim 17, wherein a library of diagnostic monitors is provided.

21. The method of claim 17, wherein each diagnostic monitor is associated with a pointcut.

22. A method comprising:
　instrumenting classes of server software with a diagnostic monitor, the diagnostic monitor including at least one diagnostic function; and
　enabling the diagnostic function at the diagnostic monitor while the server software is running without restarting the server software;
　wherein a dye mask is used at the diagnostic monitor so that the diagnostic function is only run for a subset of requests based on the dye mask and a dye vector of the request.

* * * * *

UNITED STATES PATENT AND TRADEMARK OFFICE
CERTIFICATE OF CORRECTION

PATENT NO. : 7,395,458 B2
APPLICATION NO. : 11/133633
DATED : July 1, 2008
INVENTOR(S) : Shrivastava et al.

It is certified that error appears in the above-identified patent and that said Letters Patent is hereby corrected as shown below:

In column 3, line 24, delete "an" and insert -- a --, therefor.

In column 3, line 27, delete "extensions" and insert -- eXtensions --, therefor.

In column 4, line 19, after "management" insert -- . --.

In column 6, line 3-4, delete "instramenting" and insert -- instrumenting --, therefor.

In column 7, line 2, delete "instramenting" and insert -- instrumenting --, therefor.

In column 7, line 56, delete "Hierachical" and insert -- Hierachical --, therefor.

In column 9, line 4, after "702" insert -- , --.

In column 15, line 58, after "indicates" insert -- a --.

In column 15, line 59, delete "providing" and insert -- provides --, therefor.

In column 22, line 58, after "session" insert -- . --.

In column 23-24, under "Table", line 6, delete "Page. jspService" and insert -- Page._jspService --, therefor.

In column 25-26, under "Table", line 16, delete "Enitity" and insert -- Entity --, therefor.

In column 25-26, under "Table", line 17, delete "Enitity" and insert -- Entity --, therefor.

In column 25-26, under "Table", line 18, delete "Enitity" and insert -- Entity --, therefor.

In column 25-26, under "Table", line 19, delete "Enitity" and insert -- Entity --, therefor.

In column 25-26, under "Table", line 20, delete "Enitity" and insert -- Entity --, therefor.

In column 25-26, under "Table", line 21, delete "Enitity" and insert -- Entity --, therefor.

In column 25-26, under "Table", line 22, delete "Enitity" and insert -- Entity --, therefor.

In column 25-26, under "Table", line 24, delete "Enitity" and insert -- Entity --, therefor.

In column 25-26, under "Table", line 25, delete "Enitity" and insert -- Entity --, therefor.

CERTIFICATE OF CORRECTION (continued)
U.S. Pat. No. 7,395,458 B2

In column 25–26, under "Table", line 26, delete "Enitity" and insert -- Entity --, therefor.

In column 25–26, under "Table", line 27, delete "Enitity" and insert -- Entity --, therefor.

In column 25–26, under "Table", line 28, delete "Enitity" and insert -- Entity --, therefor.

In column 25–26, under "Table", line 29, delete "Enitity" and insert -- Entity --, therefor.

In column 25–26, under "Table", line 30, delete "Enitity" and insert -- Entity --, therefor.

In column 25–26, under "Table", line 31, delete "Enitity" and insert -- Entity --, therefor.

In column 31, line 20, delete "the" and insert -- The --, therefor.

In column 31, line 21, delete "provides" and insert -- provide --, therefor.

In column 31, line 53, delete "=" and insert -- = = --, therefor.

In column 36, line 23, delete ""weblogicjms"" and insert -- "weblogic.jms" --, therefor.

In column 43, line 40, after "required" insert -- . --.

In column 55, line 46, after "etc" insert -- . --.

In column 56, line 41, delete "a" and insert -- an --, therefor.

Signed and Sealed this

Second Day of February, 2010

David J. Kappos
*Director of the United States Patent and Trademark Office*